US010075508B2

(12) United States Patent
Sivalingam et al.

(10) Patent No.: US 10,075,508 B2
(45) Date of Patent: Sep. 11, 2018

(54) APPLICATION-CENTRIC SOCIALIZATION

(71) Applicant: Microsoft Technology Licensing, LLC, Redmond, WA (US)

(72) Inventors: Lenin Ravindranath Sivalingam, Redmond, WA (US); Paramvir Bahl, Bellevue, WA (US); Abm Musa, Chicago, IL (US); David Chu, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 236 days.

(21) Appl. No.: 13/926,778

(22) Filed: Jun. 25, 2013

(65) Prior Publication Data
US 2014/0280443 A1 Sep. 18, 2014

Related U.S. Application Data

(60) Provisional application No. 61/802,357, filed on Mar. 15, 2013.

(51) Int. Cl.
*G06F 15/16* (2006.01)
*H04L 29/08* (2006.01)
*G06F 8/65* (2018.01)

(52) U.S. Cl.
CPC ............... *H04L 67/10* (2013.01); *G06F 8/65* (2013.01)

(58) Field of Classification Search
CPC ........... G06F 17/3064; G06F 17/30899; G06F 17/30997; G06Q 50/01; G06Q 30/0631; H04L 67/22; H04L 67/00; H04W 4/206
See application file for complete search history.

(56) References Cited

U.S. PATENT DOCUMENTS 8,447,747 B1 * 5/2013 Yi .................. G06F 17/3053
707/705
2008/0301231 A1 * 12/2008 Mehta .................. G06F 8/61
709/204
2009/0113437 A1 * 4/2009 Sedukhin ................ G06F 8/10
718/103

(Continued)

FOREIGN PATENT DOCUMENTS

WO 2009/055751 A1 4/2009
WO 2014/150100 9/2014

OTHER PUBLICATIONS

"International Search Report & Written Opinion for PCT Patent Application No. PCT/US2014/022226", dated Jul. 7, 2014, Filed Date: Mar. 10, 2014, 8 Pages.

(Continued)

*Primary Examiner* — Tauqir Hussain
*Assistant Examiner* — Kamran Mohammadi
(74) *Attorney, Agent, or Firm* — Rainier Patents, P.S.

(57) ABSTRACT

An application may be augmented for application-centric socialization activities for a user of the application, based on instrumenting the application for the application-centric socialization activities. The application-centric socialization activities may be launched from within the augmented application on a device, the application-centric socialization activities determined based on one or more contexts associated with the user that are determined during execution of the augmented application on the device.

20 Claims, 32 Drawing Sheets

(56) References Cited

U.S. PATENT DOCUMENTS

| | | | |
|---|---|---|---|
| 2011/0225368 A1* | 9/2011 | Burge, III | G06F 12/0862 711/118 |
| 2011/0302145 A1* | 12/2011 | Brown | G06F 17/30867 707/706 |
| 2012/0054178 A1* | 3/2012 | Tran | H04N 21/45 707/723 |
| 2012/0278740 A1* | 11/2012 | Robinson | G06F 17/30867 715/757 |
| 2013/0014040 A1* | 1/2013 | Jagannathan | G06Q 50/01 715/765 |
| 2013/0103729 A1* | 4/2013 | Cooney | G06F 17/30126 707/831 |
| 2013/0158987 A1* | 6/2013 | Xing | G06F 17/276 704/10 |
| 2013/0204886 A1* | 8/2013 | Faith | G06Q 30/0631 707/756 |
| 2013/0283377 A1* | 10/2013 | Das | G06F 21/51 726/23 |

OTHER PUBLICATIONS

Zhenyu, et al., "Towards Cloud and Terminal Collaborative Mobile Social Network Service," Retrieved Nov. 22, 2012 at <<http://www.minelab.cn/downfile/20125217355217408.pdf>>, IEEE International Conference on Social Computing (SOCIALCOM '10)/ IEEE International Conference on Privacy, Security, Risk and Trust, Aug. 20-22, 2010, pp. 623-629.

Wall, Quinton, "Context—The Secret Ingredient of Killer Mobile Apps," Retrieved Nov. 22, 2012 at <<http://www.developer.com/ws/context-the-secret-ingredient-of-killer-mobile-apps.html>>, developer.com, Aug. 23, 2012, pp. 4.

Yan, et al., "Fast App Launching for Mobile Devices Using Predictive User Context," Retrieved Nov. 22, 2012 at <<http://research.microsoft.com/pubs/163201/FalconMobisys12.pdf>>, In the Proceedings of the 10th International Conference on Mobile Systems, Applications, and Services (MobiSys'12), Jun. 25, 2012, pp. 113-126.

Wischweh, et al., "Activity-oriented Context Adaptation in Mobile Applications," Retrieved Nov. 22, 2012 at <<http://vsis-www.informatik.uni-hamburg.de/getDoc.php/publications/445/ActivityAwareness_-_camera_ready.pdf>>, In the proceeding of 8th International ICST Conference on Mobile and Ubiquitous Systems (MobiQuitous), Dec. 6, 2011, 12 pages.

Santos, et al., "Providing User Context for Mobile and Social Networking Applications," Retrieved Nov. 22, 2012 at <<http://web.ist.utl.pt/~diogo.ferreira/papers/santos10providing.pdf>>, In Pervasive and Mobile Computing, vol. 6, Issue 3, Jun. 2010, 25 pages.

"Facebook Widgets: Like. Recommend. Comment," Retrieved Nov. 22, 2012 at <<http://www.nyndesigns.com/socialize-facebook-widgets>>, nyndesigns, 2 pages.

"Trinity," Retrieved Nov. 22, 2012 at <<http://research.microsoft.com/en-us/projects/trinity/>>, Microsoft Research, 2 pages.

"Google+", Retrieved Nov. 22, 2012 at <<https://accounts.google.com/ServiceLogin?service=oz&continue=https://plus.google.com/?gpsre%3Dgplp0&hl=en>>, Google, 1 page.

"Mechanical Turk," Retrieved Nov. 22, 2012 at <<https://www.mturk.com/mturk/welcome>>, Amazon, 1 Page.

"Facebook," Retrieved Nov. 22, 2012 at <<http://www.facebook.com/>>, Facebook, 1 Page.

Backstrom, et al., "Group Formation in Large Social Networks: Membership, Growth, and Evolution," Retrieved Nov. 22, 2012 at <<http://ce.sharif.edu/~nikparto/10.1.1.62.737.pdf>>, In Proceedings of the 12th ACM SIGKDD International Conference on Knowledge Discovery and Data Mining (KDD'06), Aug. 20, 2006, 11 pages.

Dang, et al., "Community Detection based on Structural and Attribute Similarities," Retrieved Nov. 22, 2012 at <<http://www.google.co.in/url?sa=t&rct=j&q=detection+based+on+structural+and+attribute+similarities&source=web&cd=1&cad=rja&ved=0CDIQFjAA&url=http%3A%2F%2Fwww.thinkmind.org%2Fdownload.php%3Farticleid%3Dicds_2012_1_20_10025&ei=eMetUMzFAZGurAf_iYHgAw&usg=AFQjCNH793x-qgXgmi9um3AvtQQQuL8e7w>>, In Proceedings of the Sixth International Conference on Digital Society (ICDS 2012).

Wiese, et al., "Are You Close With Me? Are You Nearby? Investigating Social Groups, Closeness, and Willingness to Share," Retrieved Nov. 22, 2012 at <<http://www.cs.cmu.edu/afs/cs.cmu.edu/Web/People/jasonh/publications/ubicomp2011-relationship-sharing-final.pdf>>, In Proceedings of the 13th International Conference on Ubiquitous Computing (UbiComp'11), Sep. 17, 2011, 10 pages.

Yang, et al., "Like Like Alike: Joint Friendship and Interest Propagation in Social Networks," Retrieved Nov. 22, 2012 at <<http://www.ra.ethz.ch/CDstore/www2011/proceedings/p537.pdf>>, In Proceedings of the 20th International Conference on World Wide Web (WWW 2011), Mar. 28, 2011, pp. 537-546.

Yin, et al., "LINKREC: A Unified Framework for Link Recommendation with User Attributes and Graph Structure," Retrieved Nov. 22, 2012 at <<http://www.cs.uiuc.edu/~hanj/pdf/www10_zyin.pdf>>, In Proceedings of the 19th International Conference on World Wide Web (WWW 2010), Apr. 26, 2010, 2 pages.

"Software widget," Retrieved Dec. 26, 2012 at <<http://en.wikipedia.org/wiki/Software_widget>>, Wikipedia, 7 pages.

"Written Opinion of the International Preliminary Examining Authority" Issued in PCT Application No. PCT/US2014/022226, dated Jun. 12, 2015, 5 Pages.

"International Preliminary Report on Patentability" Issued in PCT Application No. PCT/US2014/022226, dated Sep. 8, 2015, 12 Pages.

"Written Opinion of the International Searching Authority" Issued in PCT Application No. PCT/US2014/022226, dated Sep. 15, 2015, 4 Pages.

Demand and Response filed Jan. 13, 2015 from PCT Patent Application No. PCT/US2014/022226, 21 pages.

* cited by examiner

Fandango
Skyfall — Today ▽

Top Values / Top In-app

Check-ins

| MOVIE | |
|---|---|
| The Twilight: | 326 |
| Argo | 101 |
| Skyfall | 86 |
| Lincoln | 65 |
| Looper | 25 |

Discuss | Top | Discover | My 1102
1104

1100b

Fandango
Skyfall — Today ▽

Top In-app / Top Overall

Check-ins

| APP | |
|---|---|
| Fandango | 1453 |
| MOVIE | |
| The Twilight: | 326 |
| THEATER | |
| Lincoln Square | 225 |
| MOVIE | |
| Argo | 101 |

Discuss | Top | Discover | My

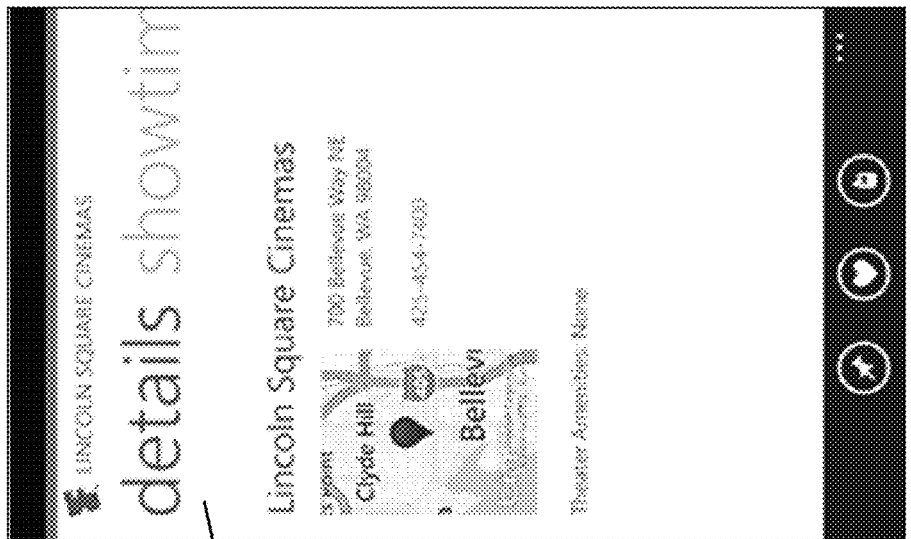
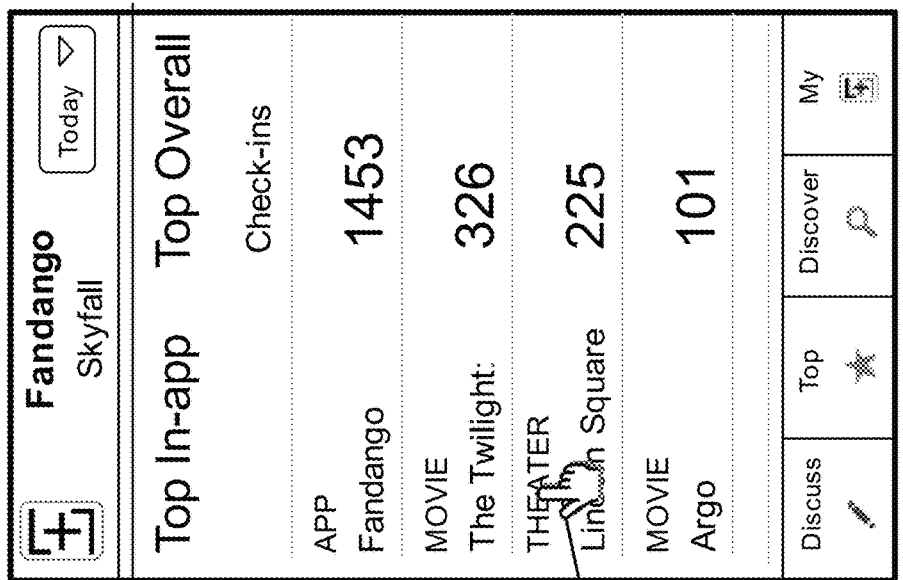
FIG. 12

1400a

Fandango
Skyfall

Related  Follows  Nearby

MOVIE  Skyfall

| | Last Activity |
|---|---|
| IMDB | 1m |
| MOVIE Skyfall | |
| TwitReviews | 10m |
| MOVIE Skyfall | |
| Rotten Tomatoes | 15m |
| MOVIE Skyfall | |
| James Bond 007 | 35m |
| APP James Bond 007 | |

| Discuss | Top | Discover | My |
|---|---|---|---|

1402

1400b

Fandango
Skyfall

Follows  Nearby  Featured

People you follow are interested in

| | | |
|---|---|---|
| Wordament | ratul | 1m |
| APP Wordament | | |
| News360 | srikanth | 10m |
| ARTICLE CIA Scandal takes... | | |
| Amazon | alec | 15m |
| PRODUCT Kindle Fire HD | | |
| MyStocks | ranveer | 35m |
| STOCK MSFT | | |

| Discuss | Top | Discover | My |
|---|---|---|---|

| ⊞ | Fandango<br>Skyfall | |
|---|---|---|
| Follows Nearby Featured | | |
| People you follow are<br>interested in | | |
| Wordament | | ratul |
| APP Wordament | | 1m |
| News360 | | srikanth |
| ARTICLE CIA Scandal takes... | | 10m |
| Amazon | | alec |
| PRODUCT Kindle Fire HD | | 15m |
| MyStocks | | ranveer |
| STOCK MSFT | | 35m |
| Discuss ✎ | Top ✱ | Discover 🔍 | My ⊞ |

1502

1500b

| ⊞ | Fandango<br>Skyfall | |
|---|---|---|
| Nearby Featured Related | | |
| People nearby you are<br>checking | | |
| SeattleTraffic | | suman |
| Route 520 | | 1m |
| OneBusAway | | sharad |
| BUS 545 | | 10m |
| Netflix | | lin |
| VIDEO Frasier | | 15m |
| WeatherBug | | stefan |
| Zipcode 98052 | | 35m |
| Discuss ✎ | Top ✱ | Discover 🔍 | My ⊞ |

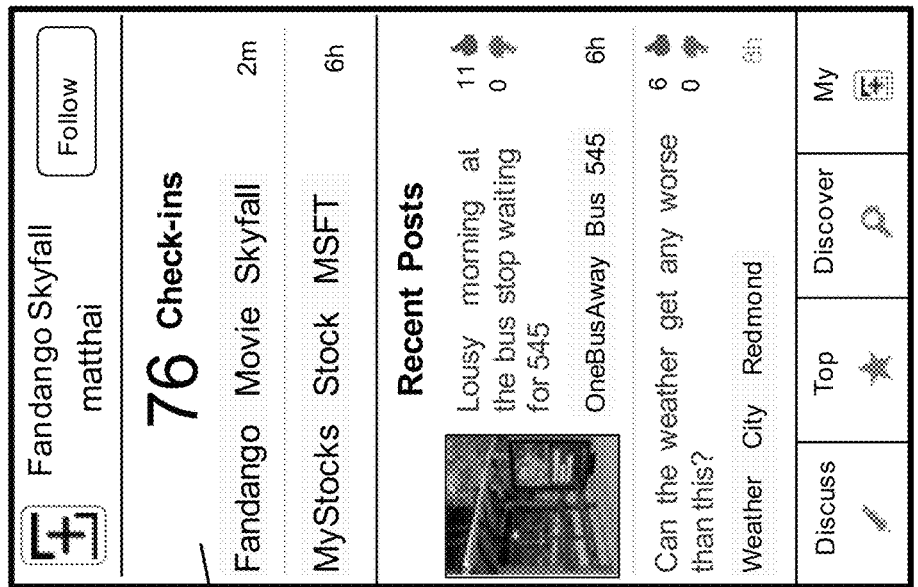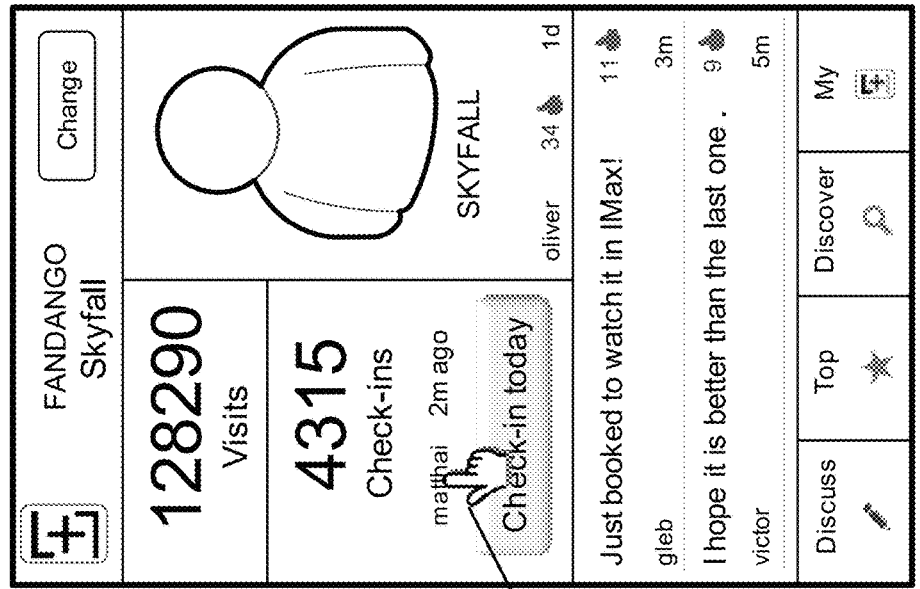
FIG. 18

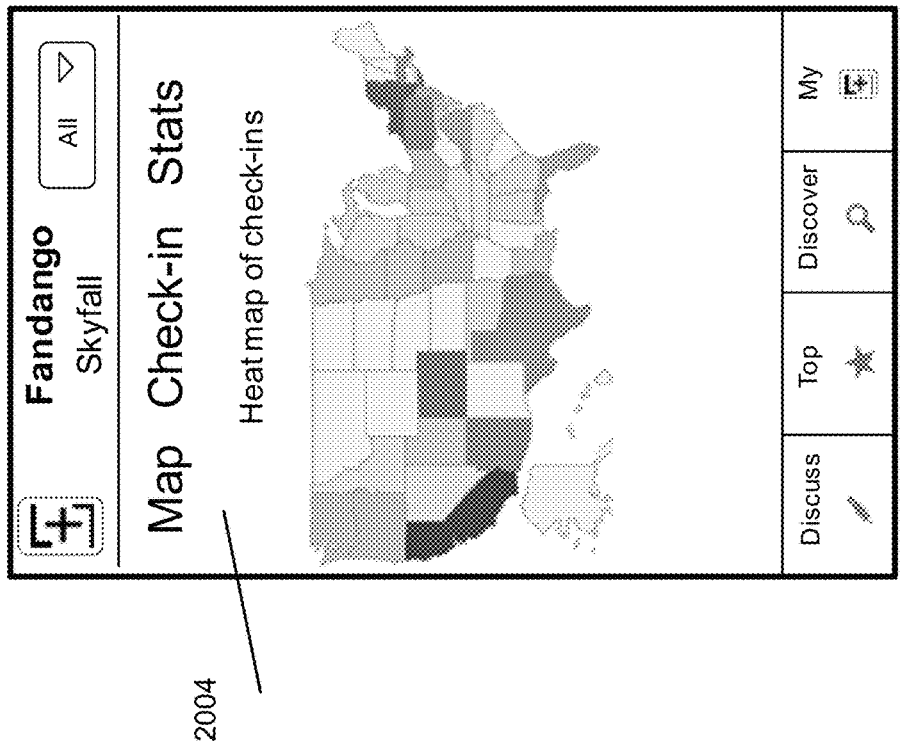
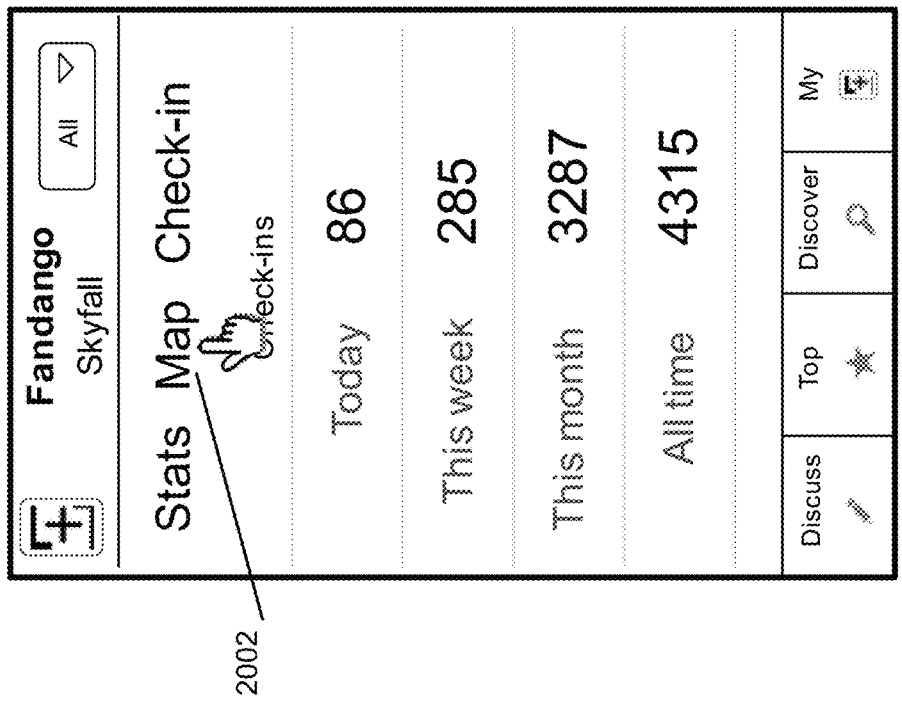
FIG. 20

2100c

(21B)

- 2118 — Determine one or more related applications based on the obtained current context

- 2120 — Initiating the application-centric socialization activity for the user includes one or more of initiating user activity in at least one of the related applications, or providing information associated with the one or more related applications to inform the user of related aspects of the one or more related applications

- 2122 — Determining the one or more related applications includes determining the one or more related applications based on a social network associated with the user (21C)

- 2124 — Determine at least one other application and content associated with the determined at least one other application based on one or more of a social network associated with the user, or a location

- 2126 — If the at least one other application is not currently installed on the device: providing information for one or more of downloading or installing the at least one other application on the device (21D)

- 2128 — The current context is represented as a pair of nodes in a context graph, wherein the pair of nodes includes a key node and a value node connected via a corresponding edge representing a key-value relationship between the key node and the value node

- 2130 — Initiate traversal of the context graph to determine one or more of a second context related to the current context, or a second application related to the current application via the current context

FIG. 21c

2300c
Obtain the first context based on one or more of at least a partial traversal of a social network that is external to the context graph, at least a partial traversal of the context graph, or a location  2318
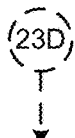
Maintain information associated with user check-in activity associated with respective context nodes  2320
FIG. 23c

The augmented application is configured to determine one or more related applications based on the obtained current context, wherein the augmented application is configured to initiate at least one of the application-centric socialization activities based on initiating user activity in at least one of the related applications
2418

The augmented application is configured to determine at least one other application and content associated with the determined at least one other application based on the obtained current context, determine whether the at least one other application is installed on the device, provide information for installing the at least one other application on the device, if the at least one other application is not currently installed on the device, and initiate execution of the at least one other application on the device, if the at least one other application is installed on the device
2420

The obtained current context is represented as a pair of nodes in a context graph, wherein the pair of nodes includes a key node and a value node connected via a corresponding edge representing a key-value relationship between the key node and the value node, wherein the augmented application is configured to initiate traversal of the context graph to determine a second context related to the obtained current context
2422

The obtained current context is represented as a pair of nodes in a context graph, wherein the pair of nodes includes a key node and a value node connected via a corresponding edge representing a key-value relationship between the key node and the value node, wherein the augmented application is configured to initiate traversal of the context graph to determine a second application related to the augmented application via the obtained current context      2424

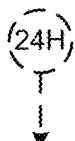

Obtaining the current context includes determining a user intention associated with the current active user usage of the augmented application during execution of the augmented application      2426

FIG. 24d

APPLICATION-CENTRIC SOCIALIZATION

CROSS-REFERENCE TO RELATED APPLICATION

This application claims the benefit of U.S. Provisional Application No. 61/802,357, filed Mar. 15, 2013, entitled "Application-centric Socialization," which is hereby incorporated by reference herein, in its entirety.

BACKGROUND

Users are increasingly using electronic devices to obtain information for many aspects of business, research, and daily life. Social networks are increasingly being used to obtain information regarding personal interests.

SUMMARY

According to one general aspect, an application may be augmented for application-centric socialization activities for a user of the application, based on instrumenting the application for the application-centric socialization activities. The application-centric socialization activities may be launched from within the augmented application on a device, the application-centric socialization activities determined based on one or more contexts associated with the user that are determined during execution of the augmented application on the device.

According to another aspect, a computer program product tangibly embodied on a computer-readable storage medium may include executable code configured to cause one or more processors to receive information for augmenting an application for application-centric socialization activities for a user of the application. The executable code may be configured to cause the one or more processors to instrument the application for the application-centric socialization activities, based on the received information. The application-centric socialization activities may be launched from within the augmented application on a device, the application-centric socialization activities determined based on one or more contexts associated with the user that are determined during execution of the augmented application on the device.

According to another aspect, a system may include an application-centric socialization engine that includes a developer input component configured to receive information for augmenting an application for application-centric socialization activities for a user of the application. An app instrumentation component may be configured to instrument the application for the application-centric socialization activities, based on the received information. The application-centric socialization activities may be launched from within the augmented application on a device, the application-centric socialization activities determined based on one or more contexts associated with the user that are determined during execution of the augmented application on the device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

FIG. 8 illustrates an example selection of top apps based on a number of check-ins.

FIG. 11 illustrates an example selection for top in-app values.

FIG. 12 illustrates an example intra-app link.

FIG. 14 illustrates an example follows selection.

FIG. 15 illustrates an example nearby selection.

FIG. 18 illustrates an example name selection.

FIG. 20 illustrates an example technique for providing analytics information to a user.

FIGS. 21a-21c are a flowchart illustrating example operations of the system of FIG. 1.

FIGS. 23a-23c are a flowchart illustrating example operations of the system of FIG. 1.

FIGS. 24a-24d are a flowchart illustrating example operations of the system of FIG. 1.

DETAILED DESCRIPTION

I. Introduction

Figure 1:
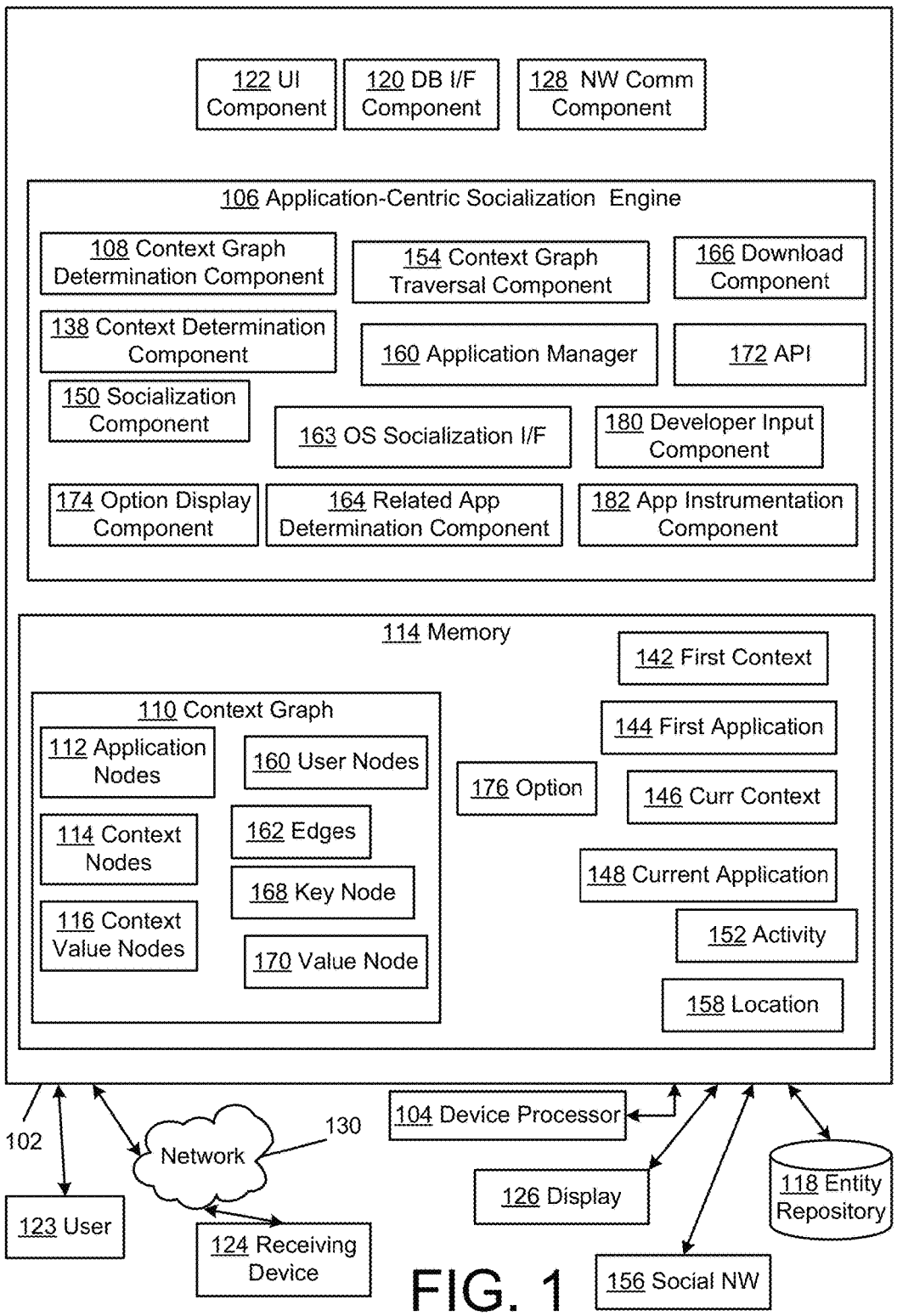
FIG. 1 is a block diagram illustrating of an example system for application-centric socialization.

Example techniques discussed herein may provide context-based in-app (e.g., application-centric) socialization. For example, any application may be augmented for such socialization, in accordance with example techniques discussed herein, and the socialization activities may be initiated from within such augmented applications. For example, novice developers may socialize their mobile applications rapidly using such example techniques from directly within development applications such as VISUAL STUDIO. Besides providing advantageous techniques for adding socialization capabilities, such example techniques may expand socialization in several ways that are related to the mobile environment. For example, such example techniques may provide support for "in the moment of the app" context-based socialization. For example, such example techniques may provide socialization from within an application, which may enable users of that application to interact with other users in relation to that application. For example, once an application is instrumented, such example techniques may capture a user's in-app context from the user's navigation activity within the application.

For example, with the assistance of developer tagging, navigation activities may be assigned semantically meaningful contexts. These contexts may then be used to aid in user discovery of like-minded users in similar contexts, building natural opportunities for interest, or context-based socialization. Example techniques discussed herein may provide customized socialization to each application via social widgets (e.g., "swidgets"). Such swidgets may include graphical user interface elements, or other user interface elements, for application users to initiate socialization activities within the application. For example, an application may select from such diverse swidgets as message boards, statistics trackers, bug discussions and betting games, etc. For example, swidgets may provide a means for applications to add new social features and potentially increase user engagement.

Example techniques discussed herein may provide an ecosystem for app developers, swidget developers, and app users. For example, a developer may initiate the socialization of an app by registering in an example web portal. Once registered, developers may use provided application programming interfaces (APIs) and services to socialize their apps. Socialization of the apps may include the addition of one or more graphical or other user interface elements to the application which enable a user to engage in social activities such as, but not limited to: discussion, games, crowdsourcing requests, screen sharing, or viewing current activity relating to features or functionalities of the application. Additionally, the web portal may provide an interface to developers where they may interact (e.g., sending messages, notifications) with a group of users in a selective manner (e.g., grouped based on the context). Additionally, aggregated app usage data and analytics may be provided to developers so that they may better understand how the app may be used in the wild. An example context API may be provided such that an app developer may be able to express in-app context with a few lines of code. Further, a set of swidgets may be provided that may be readily available to developers for integrating with their apps.

For example, when users download a socialization-enabling app (e.g., from an app marketplace), they may socialize with their peers in the context of that app through the use of one or more graphical user interface elements (or other interface elements) provided via the swidgets. For example, context-based grouping may be used to connect together only related users with related content.

For example, when users download a socialization-enabling app (e.g., from an app marketplace), they may socialize with their peer users using interfaces associated with various swidgets based on the users' in-app contexts. For example, context-based grouping may be used to connect together only related users with related content.

With the proliferation of smartphones and applications related to many different types of usage, users are increasingly using mobile apps. Further, a user's context has become a more central focus for creating intelligent apps that satisfy users' needs automatically based on context. Example techniques discussed herein may provide a capability for each app on a user's smartphone to (at least) understand what the user is trying to do with the app, provide the user with useful information relevant to the user's task, and connect the user with his/her friends or like-minded other users. As used in this context, in-app "context" may involve a determination of what a user is trying to do inside an app (e.g., based on execution activity on a device, from the app usage). For example, one or more related context-based socialization activities for a user may be determined based on the features or functionalities of the application, or contextual information such as current active user usage of the application, execution activity on a device from the application usage, or environmental information collected from a device's sensors (e.g., GPS, gyroscope, camera, or microphone). For example, as used herein, a "context" may refer to (but is not limited to) current active user usage of an augmented application, execution activity of an augmented application during execution of the augmented application on the device, features or functionalities of the augmented application, or environmental information collected from a sensor associated with the device.

For example, each app loaded on a device may have a different set of contexts that may be appropriate for that individual app. For example, contexts for a bus tracker app may include route, stop, and direction. For example, contexts for a stocks app may include company and price. For example, contexts for a movie app may include theater, movie being played, and location, etc. Thus, applications may be associated with various contexts. Example techniques discussed herein may use such contexts to provide discovery, socialization, engagement, and analytics.

For example, a user may use an application such as FANDANGO to obtain information regarding one or more movies. For this example, a context may include the movie currently being viewed (on FANDANGO) by the user. For example, techniques discussed herein may glean the context out of the application (e.g., FANDANGO) to enable discovery, socialization, engagement, and analytics.

Example techniques discussed herein may provide a mechanism for socializing through any application loaded on a device. Thus, any application may advantageously utilize the social fabric in this context. Thus, any application may utilize these example techniques, and any user may be able to perform socialization activity through any application.

In accordance with example techniques discussed herein, a system may determine what a user is doing with a particular application, based on the activity of the user during execution. For example, the system may determine that a user of FANDANGO is currently viewing information related to "Gone with the Wind." For example, the system may then determine that another user is viewing information related to "Gone with the Wind" on another application such as Internet Movie Database (IMDB). For example, the first user may be informed, via a socialization activity, that information relating to "Gone with the Wind" may also be available on IMDB (possibly different types of information from that found in FANDANGO). For example, if such a recommendation is made to a user to use another application—and that other application is not currently available/loaded on the user's device, a recommendation can be made to download the application (e.g., via an app store or app marketplace).

For example, the user (of these example techniques) may determine what is currently trending on a network (e.g., the Internet), as well as determining what other people may currently be using the application (e.g., a socialization activity on the web). For example, a user may be provided with information regarding which of his/her friends are viewing a particular piece of information.

II. Example Operating Environment

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

As further discussed herein, FIG. 1 is a block diagram of a system 100 for application-centric socialization. As shown in FIG. 1, various components may or may not be included in various different embodiments. For example, components discussed below that involve context graph functionality may be implemented on user devices, as well as on other devices such as backend server devices. For example, various components discussed below for enabling developers to instrument various apps for socialization may be implemented separately from other components that may enable the user socialization with such augmented apps. One skilled in the art of data processing will understand that there are many ways to implement the functionalities discussed below, without departing from the spirit of the discussion herein.

As shown in FIG. 1, a system 100 may include a device 102 that includes at least one processor 104. The device 102 includes an application-centric socialization engine 106 that may include a context graph determination component 108 that may be configured to maintain a context graph 110 that includes a plurality of application nodes 112 representing a plurality of respective applications, a plurality of context nodes 114 representing a plurality of respective contexts associated with the respective plurality of application nodes 112, and a plurality of context value nodes 116 representing a plurality of respective context values associated with the respective plurality of context nodes 112. For example, the context graph 110 may be stored in a memory 114 (e.g., any type of computer-readable or computer-accessible storage device).

For example, the application-centric socialization engine 106, or one or more portions thereof, may include executable instructions that may be stored on a tangible computer-readable storage medium, as discussed below. For example, the computer-readable storage medium may include any number of storage devices, and any number of storage media types, including distributed devices.

For example, an entity repository 118 may include one or more databases, and may be accessed via a database interface component 120. One skilled in the art of data processing will appreciate that there are many techniques for storing repository information discussed herein, such as various types of database configurations (e.g., relational databases, hierarchical databases, distributed databases) and non-database configurations.

According to an example embodiment, the device 102 may include the memory 114 that may store the context graph 110. In this context, a "memory" may include a single memory device or multiple memory devices configured to store data and/or instructions. Further, the memory 114 may span multiple distributed storage devices.

According to an example embodiment, a user interface component 122 may manage communications between a device user 123 and the application-centric socialization engine 106. The device 102 may be associated with a receiving device 124 and a display 126, and other input/output devices. For example, the display 126 may be configured to communicate with the device 102, via internal device bus communications, or via at least one network connection.

According to example embodiments, the display 126 may be implemented as a flat screen display, a print form of display, a two-dimensional display, a three-dimensional display, a static display, a moving display, sensory displays such as tactile output, audio output, and any other form of output for communicating with a user (e.g., the device user 123).

According to an example embodiment, the system 100 may include a network communication component 128 that may manage network communication between the application-centric socialization engine 106 and other entities that may communicate with the application-centric socialization engine 106 via at least one network 130. For example, the network 130 may include at least one of the Internet, at least one wireless network, or at least one wired network. For example, the network 130 may include a cellular network, a radio network, or any type of network that may support transmission of data for the application-centric socialization engine 106. For example, the network communication component 128 may manage network communications between the application-centric socialization engine 106 and the receiving device 124. For example, the network communication component 128 may manage network communication between the user interface component 122 and the receiving device 124.

In this context, a "processor" may include a single processor or multiple processors configured to process instructions associated with a processing system. A processor may thus include one or more processors processing instructions in parallel and/or in a distributed manner. Although the processor 104 is depicted as external to the application-centric socialization engine 106 in FIG. 1, one skilled in the art of data processing will appreciate that the processor 104 may be implemented as a single component, and/or as distributed units which may be located internally or externally to the application-centric socialization engine 106, and/or any of its elements.

For example, the system 100 may include one or more processors 104. For example, the system 100 may include at least one tangible computer-readable storage medium storing instructions executable by the one or more processors 104, the executable instructions configured to cause at least one data processing apparatus to perform operations associated with various example components included in the system 100, as discussed herein. For example, the one or more processors 104 may be included in the at least one data processing apparatus. One skilled in the art of data processing will understand that there are many configurations of processors and data processing apparatuses that may be configured in accordance with the discussion herein, without departing from the spirit of such discussion. For example, the data processing apparatus may include a mobile device.

In this context, a "component" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components).

The application-centric socialization engine 106 may include a context determination component 138 configured to obtain a first context 142 associated with a first application 144 of the plurality of respective applications that is based on usage of the first application 144.

For example, the context determination component 138 may be configured to obtain the first context 142 based on obtaining a current context 146 associated with a current application 148 that is determined based on a current active user usage of the current application 148.

For example, a socialization component 150 may be configured to determine a context-based socialization activity 152 for the user based on at least a partial traversal of the context graph 110, based on the obtained current context 146.

For example, a context graph traversal component 154 may be configured to initiate traversal of the context graph 110 to determine one or more of a second context related to the current context 146, or a second application related to the current application 148 via the current context 146.

For example, the socialization component 150 may be configured to initiate the context-based socialization activity based on one or more of initiating user networking activity, initiating user discovery activity, initiating user engagement activity, initiating user social interaction activity, or initiating provision of analytics data.

For example, the context graph determination component 108 may be configured to add the first context 142 associated with the first application 144 to the context graph 110, based on adding, to the context graph 110, a new context node 114 associated with the first context 142, a new context value node 116 associated with a value of the first context 142, a new link to a first value of content associated with the new context node 114, and a new context graph edge indicating a key-value relationship between the new context node 114 and the new context value node 116.

For example, the context determination component 138 may be configured to obtain the first context 142 based on one or more of at least a partial traversal of a social network 156 that is external to the context graph 110, at least a partial traversal of the context graph 110, or a location 158.

For example, the context graph 110 may include one or more of a plurality of user nodes 160 representing a plurality of respective users, a plurality of graph edges 161 indicating user-user relationships between a portion of pairs of the respective users, a plurality of graph edges indicating user-application relationships between a portion of pairs of the respective users and applications, or a plurality of graph edges indicating user-context relationships between a portion of pairs of the respective users and contexts.

For example, the context graph determination component 108 may be configured to maintain information associated with user check-in activity associated with respective context nodes 114.

Figure 2:
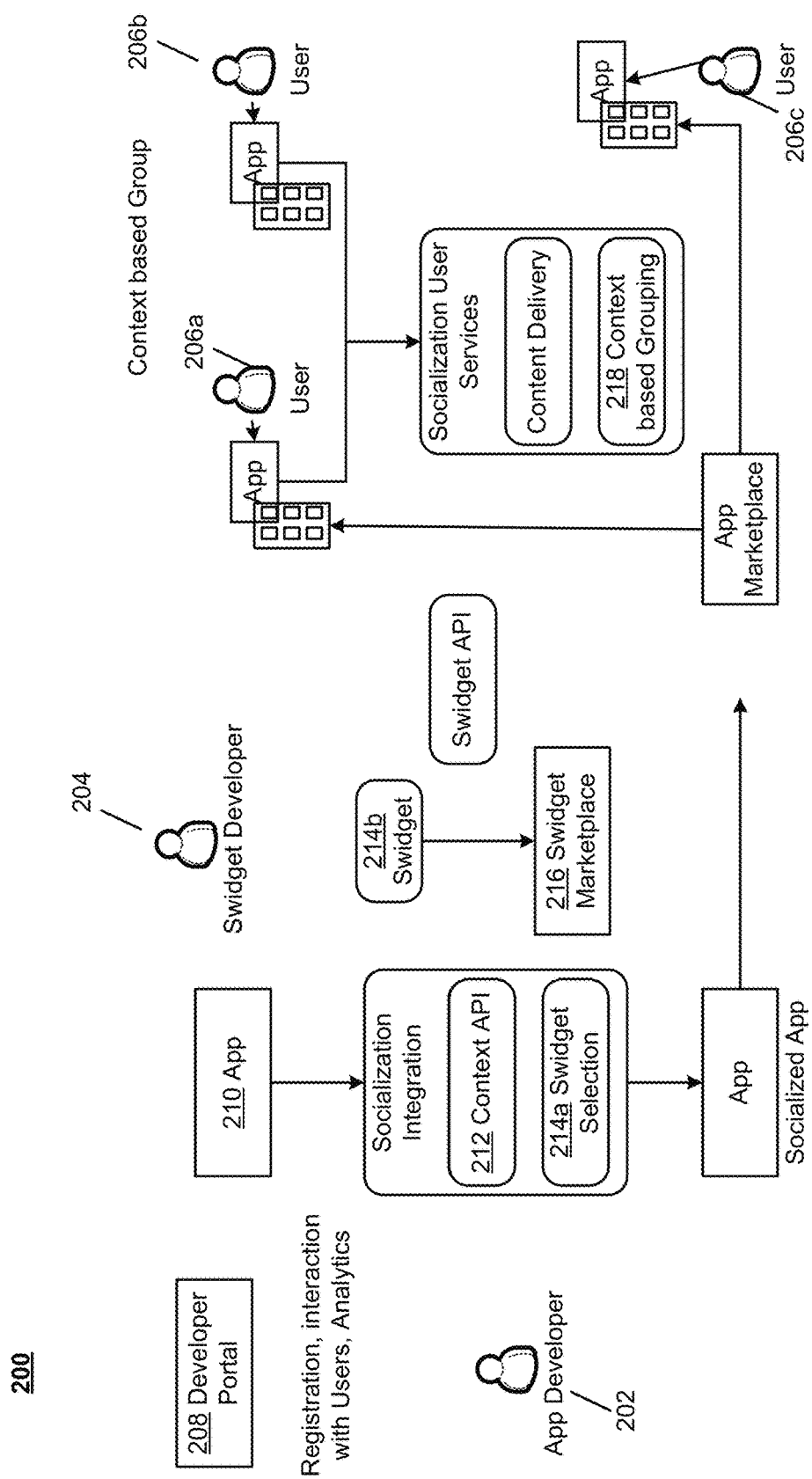
FIG. 2 illustrates an example architecture of an example platform for application-centric socialization.

FIG. 2 illustrates an example architecture 200 of an example platform. For example, there may exist an ecosystem for three different parties: app developers 202, swidget developers 204, and app users 206a, 206b, 206c. For example, the app developers 202 may initiate the socialization of their apps by registering in a web portal 208. Once registered, developers 202 may use the portal's APIs and services to socialize their apps 210. Additionally, the web portal 208 may provide an interface to developers 202 where they may interact (e.g. sending message, notifications) with a group of users in a selective manner (grouped based on the context). For example, aggregated app usage data and analytics may be provided to developers 202 so that they may better understand how their apps are used in the wild. For example, a simple and easy-to-use context API 212 may be provided by which an app developer 202 may express in-app context with a few lines of code. Further, swidgets 214a may be provided, that are readily available to developers 202 for integrating with their apps 210. For example, customized swidgets 214b may be available in addition to provided swidgets 210a. Further, in parallel to thousands of apps there may be hundreds of swidgets that may be easily plugged-in into apps on the example platform.

Hence an swidget marketplace 216 may be supported where third-party developers may distribute their own swidgets. Once a user downloads an enable app from the app-marketplace 216, she may be able to socialize with her peer users using various swidgets based on her in-app context. For example, context-based grouping 218 may be used to connect together only related people with related content.

For example, users may be able to socialize among themselves, as well as through using the application.

For example, to capture the in-app context a simple API 212 may be provided with a single method as shown below.

socialPlusControl.AddContext(string key, string
    value, bool isKnown, bool isTopContext)    (1)

The second parameter value (a string "value") represents the user's action (e.g., clicked item, selection, typed input etc.) and the first parameter ("key") associates semantic meaning to the value. For the case of OneBusAway, for example, the "value" for a bus route may be any route (e.g. B-line, 244, 248, etc.). However, it may be difficult to understand what "B-line" means unless tag this value is tagged with some indicator (e.g., a word, or other symbolic expression) describing the meaning. For example, the first parameter "key" may associate the semantic meaning to any "values." For example, a developer may select the key from a set of predefined keys supplied by the platform. However, the developer may be allowed to use a new key if the predefined set does not include an appropriate key, from the developer's perspective. In such case, for example, a "key" may be obtained that is associated with the "value," but the "key" may not be understood, as it does not belong to the set of predefined keys.

For example, the platform may support the use of developer defined keys, as allowing keys only from the set may be somewhat restrictive for expressing many possible contexts for thousands of apps. For example, the meaning of developer defined keys may be learned later, and may be included in the set of predefined keys. For example, developers may set the third parameter "isKnown" to true if they obtain the "key" from the predefined set, and to false otherwise.

For example, the AddContext( ) method may include another parameter "isTopContext" to indicate a current "top" context.

In accordance with example techniques discussed herein, content may be retrieved that is related to the selected contexts. For example, as more contexts are added, it may be possible to become more selective on the content that is retrieved. In the presence of no context, all social content may be selected. As discussed herein, developers may be able to add their own contexts. Further, developers may build one or more social networks based on the application(s).

For example, an swidget developer 204 may use methods such as an AttachContext( ) method, which may be indicated as shown in Algorithm 1:

Algorithm 1
AttachContext( )

```
1  int AttachContext (Context context)
2  class Context {
4      Tag [ ] tags ,
5      Guid appGuid ,
6      Guid userId ,
```

-continued

```
Algorithm 1
AttachContext( )

7    DateTime time ,
 8    Location location
 9 }
10 class Tag {
11 string key ,
12 string value
13 }
``` to associate context information to content (e.g., message posts, comments, notifications, images, data) during storage, and a RetrieveContexts( ) method, which may be indicated as shown in Algorithm 2:

```
Algorithm 2
RetrieveContexts( )

1 int [ ] RetrieveContexts ( ContextFilter filter )
 2 class ContextFilter {
 4    Tag [ ] tags ,
 5    Guid appGuid ,
 6    Guid userId ,
 7    DateTime startTime ,
 8    DateTime endTime ,
 9    Location location ,
10    float radius
11 }
``` to obtain the stored content that satisfies appropriate context.

For example, when developers 202 write applications, they may use a plug-in that may be incorporated into each application 210. For example, a server backend application may be used to interact with the applications via the plug-in used by developers for their applications.

Alternatively, an interface may be used in an operating system, such that the interface may be part of every application that is installed on the device hosting the operating system.

An application manager 162 may be configured to initiate execution of a current application on a device. For example, the application manager 162 may initiate execution of the current application 148 on the device 102.

For example, the socialization component 150 may be configured to initiate an application-centric socialization activity for a user, the application-centric socialization activity based on user execution activity of the current application 148.

For example, the current application 148 may be selected as any application of a plurality of different applications on the device 102.

For example, initiating the application-centric socialization activity may include one or more of initiating the application-centric socialization activity based on a request from the user, initiating the application-centric socialization activity based on a current popularity of the socialization activity that is associated with a context associated with usage of the current application, initiating the application-centric socialization activity from within the current application 148, or initiating the application-centric socialization activity from an operating-system socialization interface 163.

For example, the context determination component 138 may be configured to obtain a current context 146 associated with the current application 148 that is determined based on a current active user usage of the current application 148.

For example initiating the application-centric socialization activity may include initiating a related context-based socialization activity for the user based on the obtained current context 146.

For example, obtaining the current context 146 may include one or more of determining a theme of content in the current application, determining a topic of a page associated with the current application, determining a category of the page associated with the current application, or determining a user intention associated with the current active user usage of the current application.

For example, a related application determination component 164 may be configured to determine one or more related applications based on the obtained current context 146.

For example, initiating the application-centric socialization activity for the user may include one or more of initiating user activity in at least one of the related applications, or providing information associated with the one or more related applications to inform the user of related aspects of the one or more related applications.

For example, determining the one or more related applications may include determining the one or more related applications based on a social network 156 associated with the user.

For example, the related application determination component 164 may be configured to determine at least one other application and content associated with the determined at least one other application based on one or more of a social network associated with the user, or a location.

For example, a download component 166 may be configured to provide information for one or more of downloading or installing the at least one other application on the device, if it is determined that the at least one other application is not currently installed on the device.

For example, the current context 146 may be represented as a pair of nodes in a context graph 110, wherein the pair of nodes includes a key node 168 and a value node 170 connected via a corresponding edge 161 representing a key-value relationship between the key node 168 and the value node 170.

For example, the context graph traversal component 154 may be configured to initiate traversal of the context graph 110 to determine one or more of a second context related to the current context 146, or a second application related to the current application 148 via the current context 146.

Figure 3:
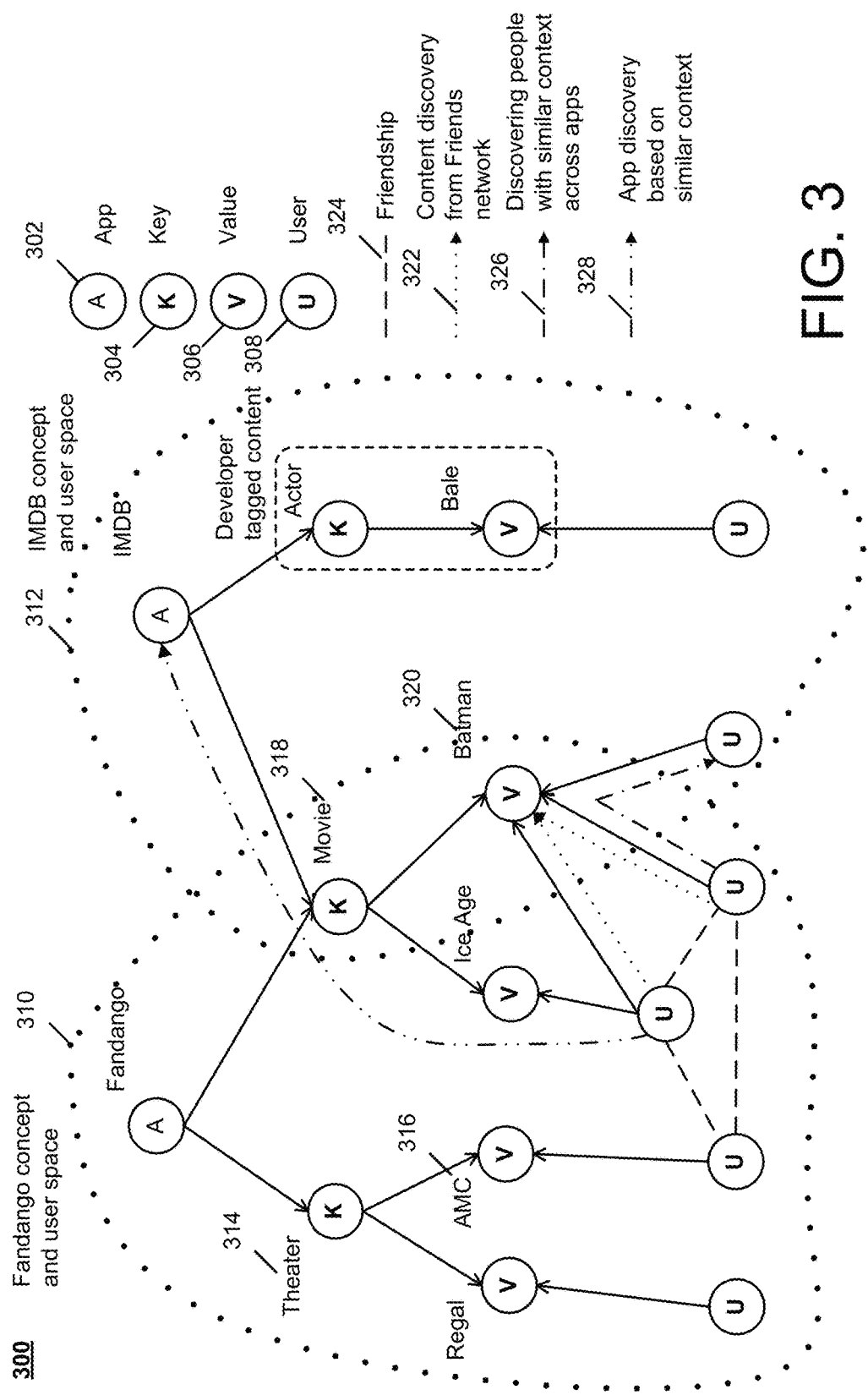
FIG. 3 illustrates an example context graph.

FIG. 3 illustrates an example context graph 300. As shown in FIG. 3, the context graph 300 includes app nodes 302, key nodes 304, value nodes 306, and user nodes 308. As shown in FIG. 3, two concept and user spaces 310, 312, for respective applications FANDANGO and IMDB, are shown as encompassed by dotted lines (for visual illustration). Apps, users and in-app contexts may form a graph structure such as that shown in FIG. 3. For example, the context graph 300 shows two movie apps (FANDANGO and IMDB) with some in-app context (e.g., developer tagged key-value pairs such as Theater (314)=AMC (316), Movie (318)=BATMAN (320) are shown), along with a plurality of users 308.

Example techniques discussed herein may bring together (at least) three entities: users, apps, and contexts, in such an example graph structure, and the graph may grow dynamically over time, with rich relations among these entities. Many example operations can be performed on this graph to extract useful information. For examples three such operations (e.g., content discovery from friend network, context based friend discovery across apps, context based app discovery) are illustrated in FIG. 3, as discussed below.

For example, finding various content liked by friends may be performed on the graph 300, as shown by nodes connected via "content discovery from friends" dotted lines 322 (e.g., user nodes connected via "friendship" dashed lines 324).

For example, like-minded users having similar interest across apps may be discovered by relating apps with a same context (or similar) key, as shown by nodes connected via "discovering people with similar context across apps" mixed dashed and dotted lines 326.

For example, apps that are related to each other may be discovered based on their shared context, as shown by nodes connected via "app discovery based on similar context" mixed dashed and dotted lines 328. For example, contextually related apps may be recommended to users, based on the graph 300.

Conventionally, there may be thousands of mobile apps in the marketplace that are very isolated from one other. In accordance with example techniques discussed herein, apps may complement each other and enhance user experience by sharing various services and relevant information. For example, a user may purchase a ticket for an evening movie using the movie app FANDANGO. The restaurant review app YELP may automatically obtain this information from FANDANGO and suggest a restaurant with matching time and location. Moreover, if the user wishes to use public transit, an example bus tracker app may plan a route connecting the user's home, the theater, and the restaurant at an appropriate time.

The example graph 300 discussed above provides example techniques for connecting related apps based on context. However, related apps may also be connected in an example graph implicitly by analyzing, mining, and clustering the context values beside the context keys. Additionally, federation among apps may be determined with developers' explicit participation. Besides providing contextual relationship among apps, example techniques discussed herein may provide many services to developers and bring them under a single platform.

Figure 4A:
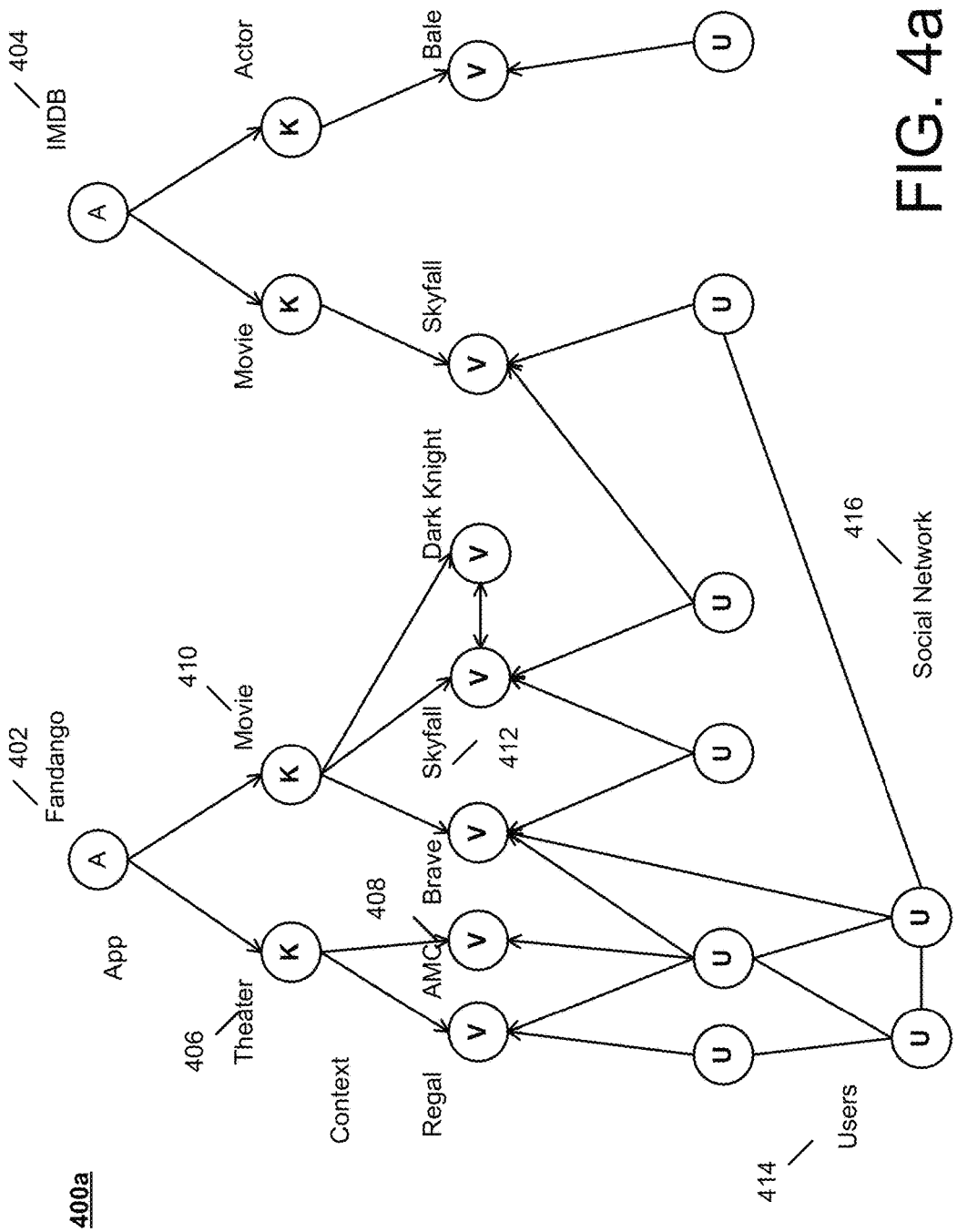
FIGS. 4a-4b illustrate an example context graph.
Figure 4B:
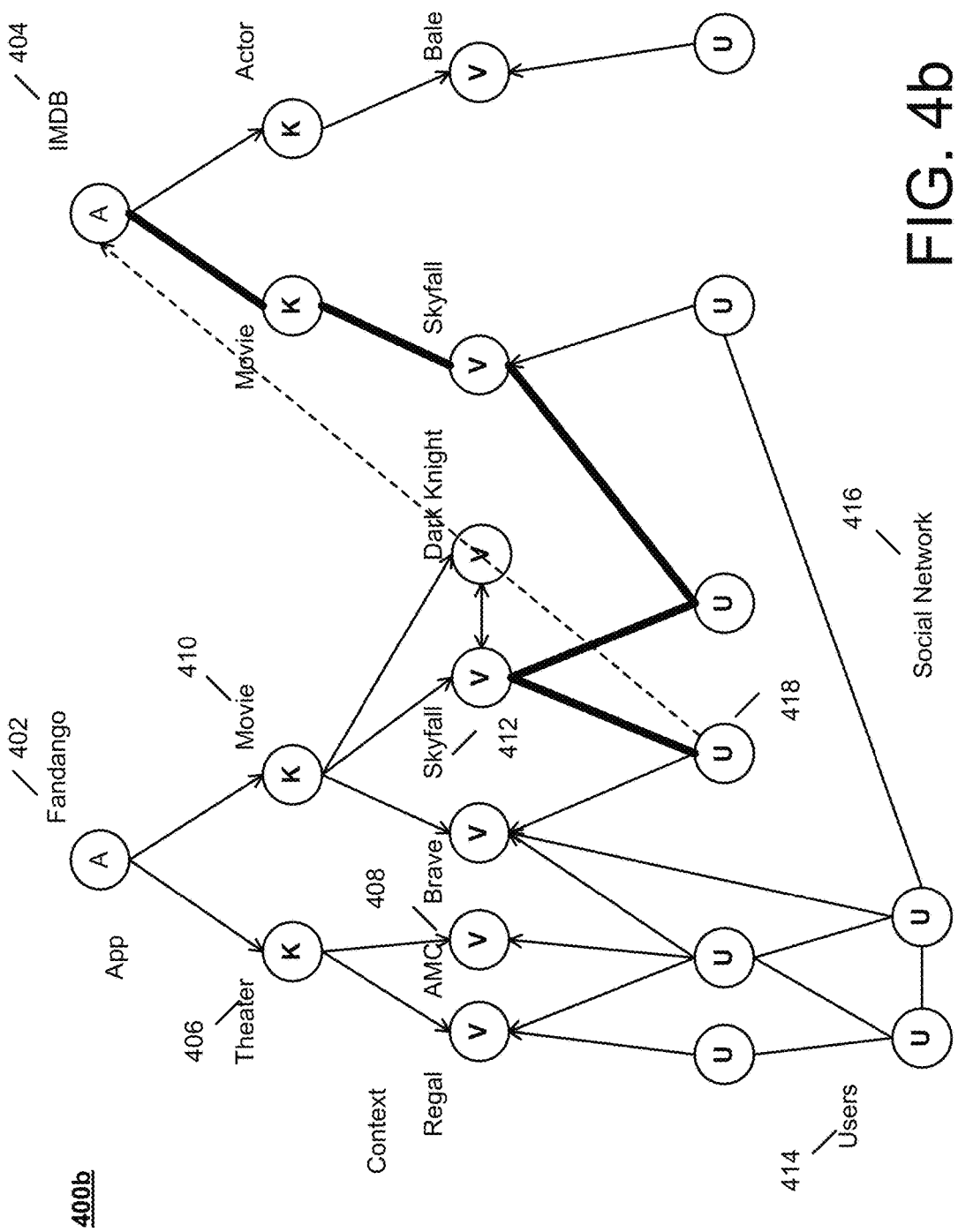

FIGS. 4a-4b illustrate another context graph 400a, 400b that includes app nodes, key nodes, value nodes, and user nodes, with two concept and user spaces for respective applications FANDANGO 402 and IMDB 404, similarly as in FIG. 3 discussed above. For example, the context graph 400a shows the two movie apps (FANDANGO 402 and IMDB 404) with some in-app context (e.g., developer tagged key-value pairs such as Theater (406)=AMC (408), Movie (410)=SKYFALL (412) are shown), along with a plurality of users. As shown in FIG. 4a, users 414 may be connected via a social network 416. As shown in FIG. 4b, a user 418 may obtain a recommendation of the app IMDB 404 via connections in the graph 400b.

Figure 5:
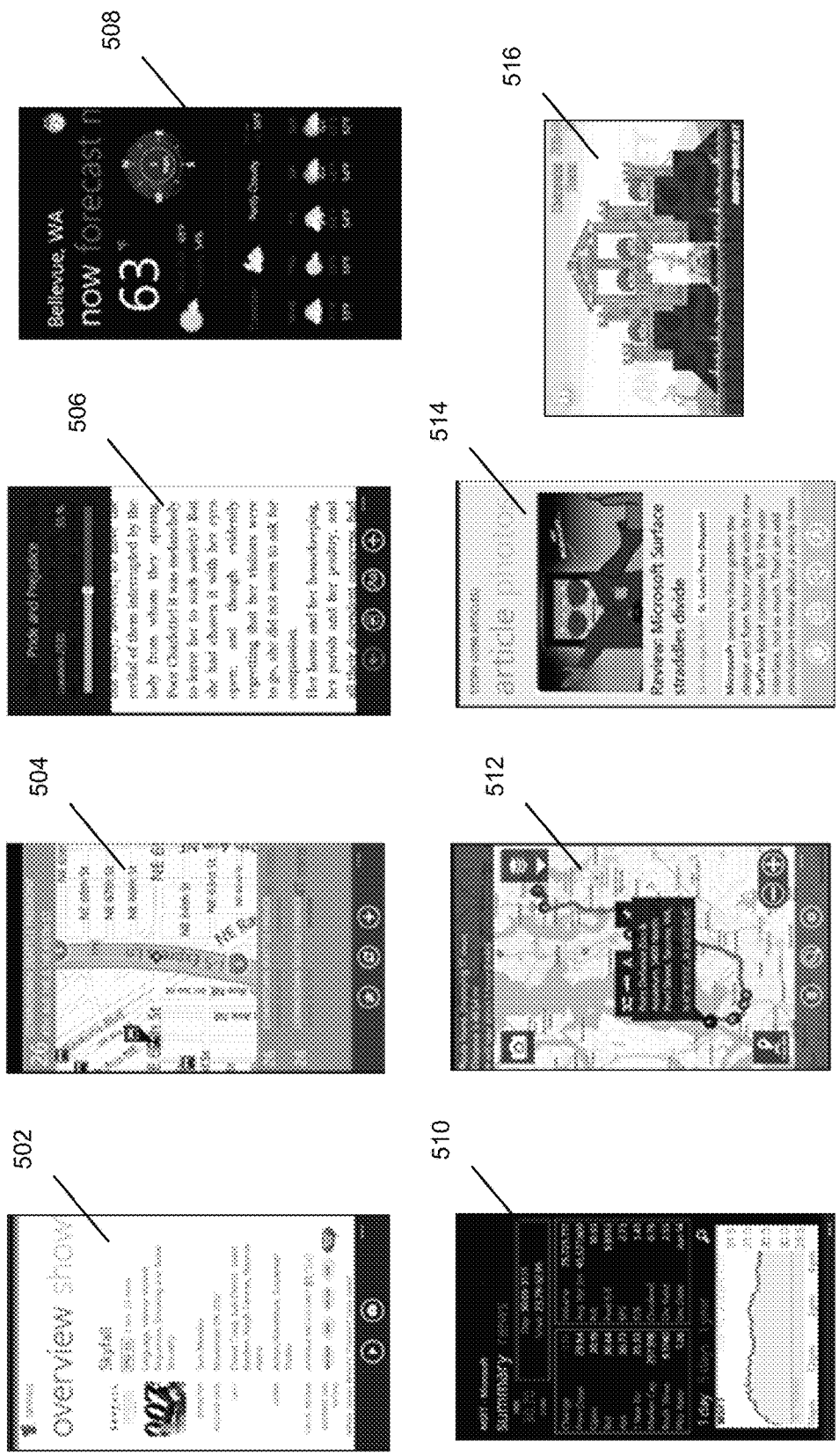
FIG. 5 illustrates example in-app contexts based on users' current interests within example applications.

FIG. 5 illustrates example in-app contexts based on users' current interests within example applications. For example, applications may be loaded for use on a mobile device (e.g. mobile device apps may tend to have a well-defined context). For example, apps may tend to be associated with a topic, or a category. Based on a user's usage of an application, the example system 100 discussed herein may capture user intentions (e.g., or user intents in the app—e.g., "I am what apps I use").

For example, a user of a device 502 may access the movie app FANDANGO, in a scenario indicating "I want to watch" a "Movie" named "SKYFALL." For example, a user of a device 504 may access a bus app ONEBUSAWAY, in a scenario indicating "I am waiting for" a "Bus 26." For example, a user of a device 506 may access a KINDLE app, in a scenario indicating "I am reading" a "Book" named "Pride and Prejudice." For example, a user of a device 508 may access a WEATHERBUG app, in a scenario indicating "I live in" a "City" named "Bellevue."

For example, a user of a device 510 may access a MYSTOCKS app, in a scenario indicating "I am interested in" a "Stock" named "MSFT." For example, a user of a device 512 may access a BINGMAPS app, in a scenario indicating "I am going to" a "Destination" named "Zoo." For example, a user of a device 514 may access a NEWS360 app, in a scenario indicating "I am reading" an "Article" relating to the "MICROSOFT SURFACE." For example, a user of a device 516 may access an ANGRYBIRDS app, in a scenario indicating "I am playing" a "Level" named "B7."

Figure 6:
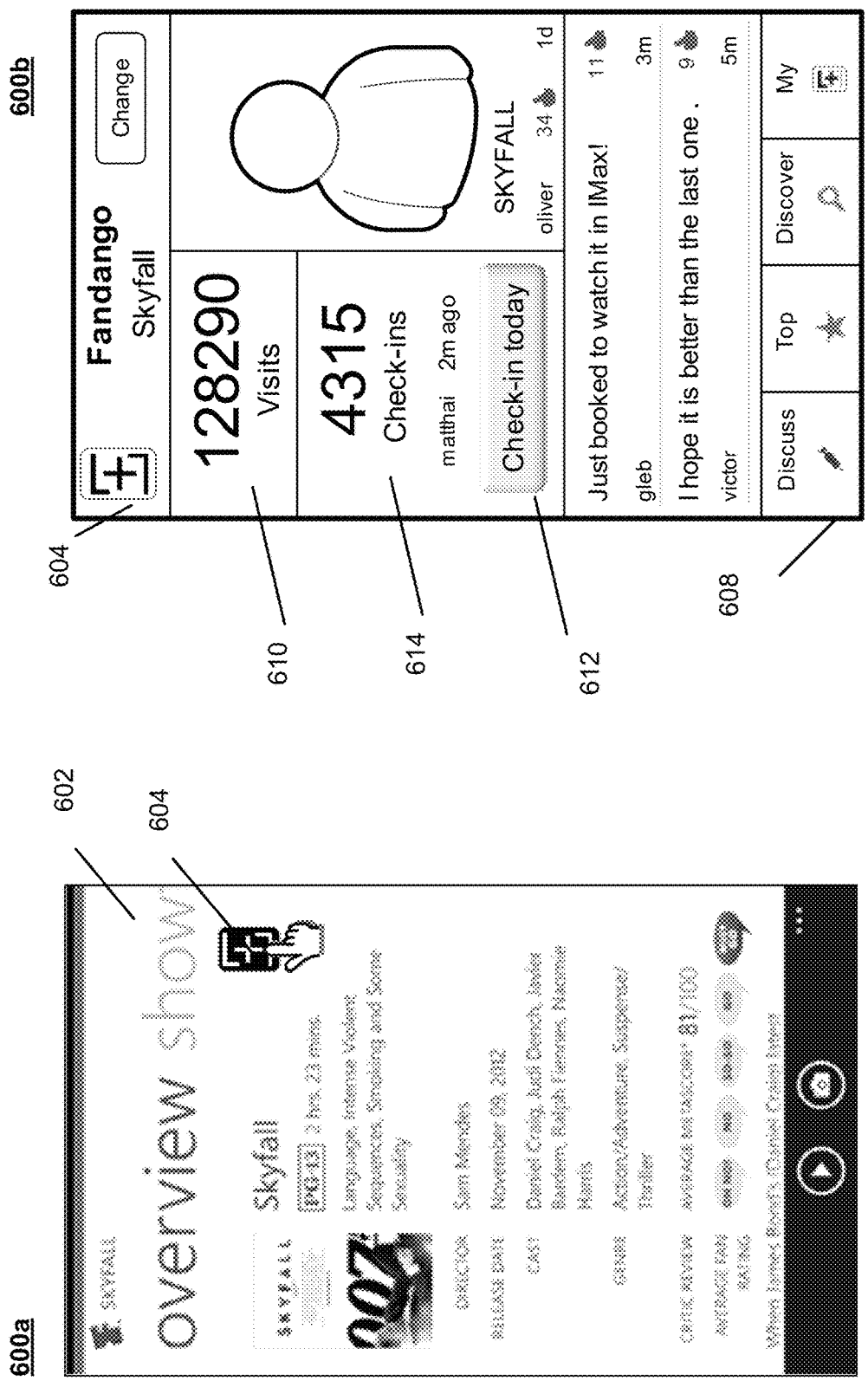
FIG. 6 illustrates an example socialization activity on a device.

FIGS. 6-20 discussed below illustrate various example socialization activities that may be provided in accordance with example techniques discussed herein. For example, within execution of an app 602, a user may access a socialization activity by selecting a selection icon 604 displayed on the device (e.g., or a button on the device itself), as shown in FIG. 6. For example, the user may be using the movie app FANDANGO 602 to view information relating to the movie "SKYFALL." Upon a user selection of the selection icon 604, the user may receive a discovered FANDANGO view 600b of information related to the movie "SKYFALL." For example, the user may be offered options 608 that may include example selections such as "Discuss," "Top," "Discover," and "My." Further, the user may receive information regarding a number of visits 610 to the received information, and may be offered a selectable opportunity 612 to "check in" to the information, as well as receiving information regarding a current number 614 of check-ins.

For example, the current application 148 may be instrumented for socialization via an application programming interface (API) 172 that includes a context-setting function based on setting contexts, context values, and links to pages associated with the respective contexts.

Figure 7:
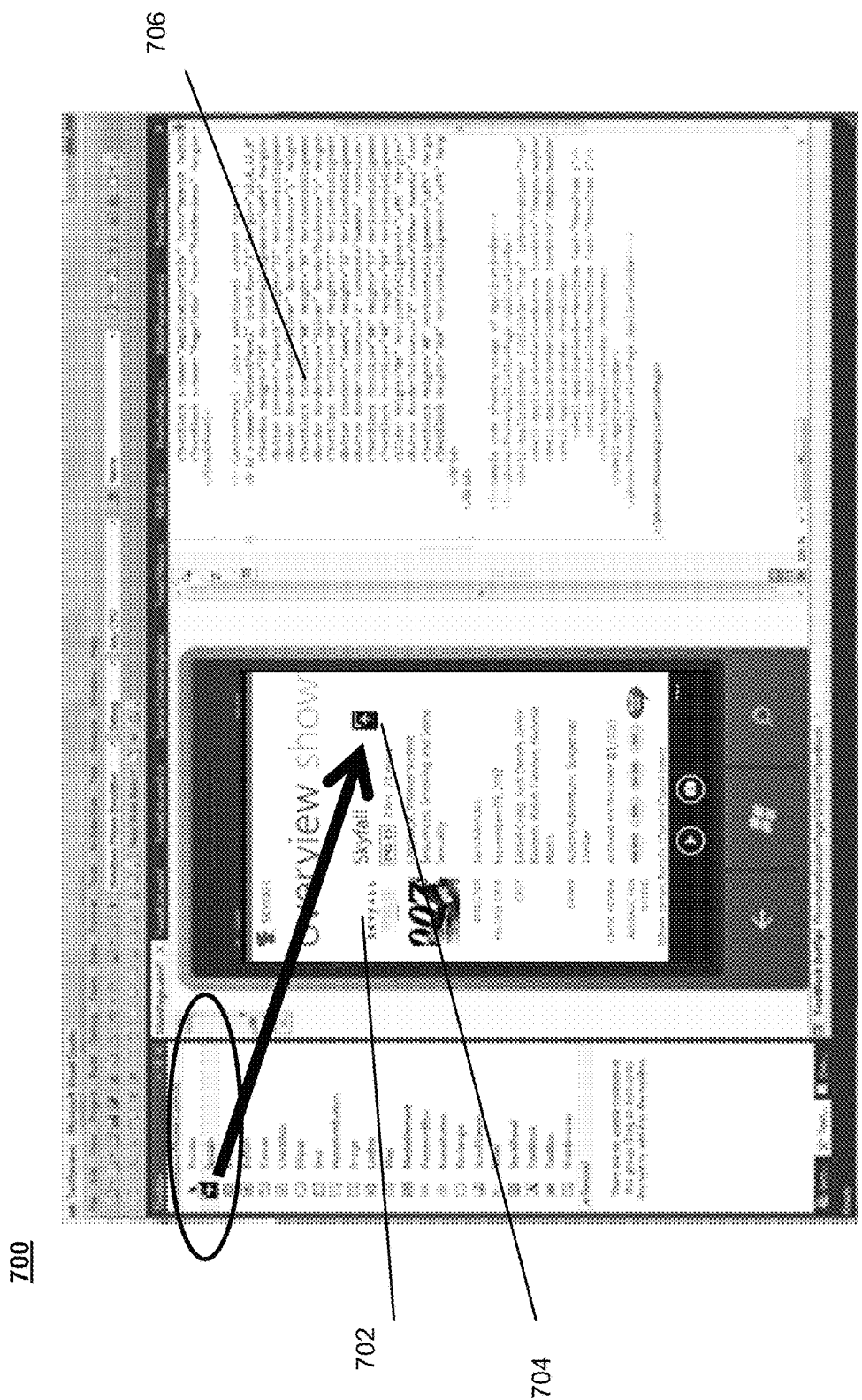
FIG. 7 illustrates an example addition of socialization to an app via an example drag and drop operation.

For example, a developer may add socialization to an app 702 by dragging and dropping a plug-in (e.g., illustrated as icon 704) in a development application such as VISUAL STUDIO 706, as shown in FIG. 7.

For example, the developer API may be accessed via a call to a function (e.g., SocialPlusControl.SetContext(Key, Value, Link)) based on a key, value, and a link (e.g., the API exposes a key). For example, the key value may include a topic or category. For example, common keys may be exposed that may be used across apps. For example, keys such as Movie, City, Level, Article, Book, Stock etc. may be used. For example, a "context" in this sense may be expressed as a key, value pair.

For example, the "Value" may include the value of the key. For example, a movie key may have a value of "Skyfall," while a city key may have a value of "Bellevue," a level key may have a value of "Level 39," etc. For example, the link may include a link to reach a page associated with the app. For example, if the device does not have the app, the link may include a link to an app store to download the app.

Figure 8:
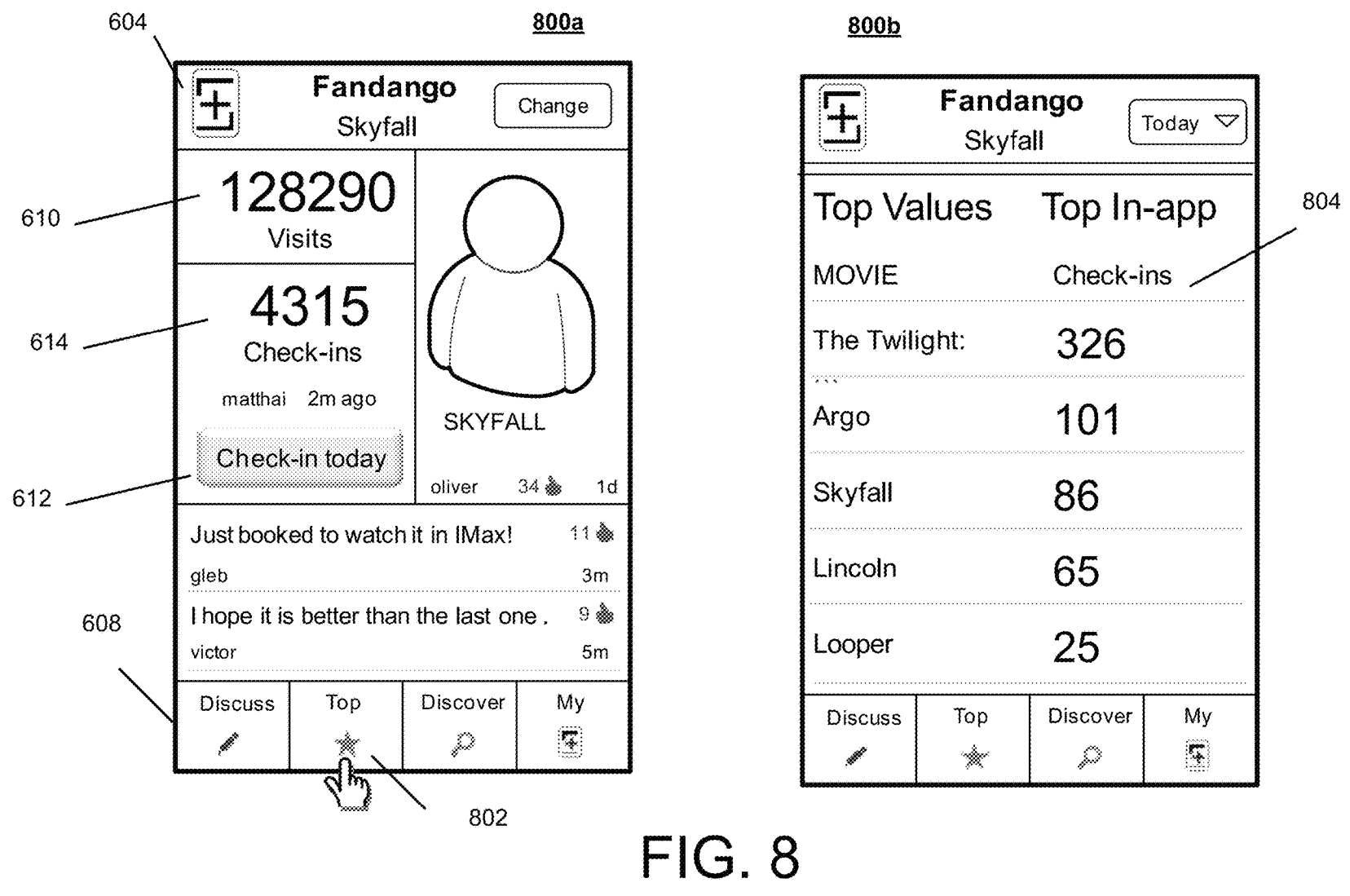

For example, the socialization app may provide an ability to "check-in" to a context, as shown in FIG. 6. For example, such a "check-in" activity may take a user to the app, as well as maintain information regarding users who have checked in, for sharing with other users. For example, a user may determine an app's popularity based on the check-in features. For example, the user may select 802 a determination of "top apps," based on a number of check-ins 804, as shown in FIG. 8.

For example, the socialization application may increase engagement based on swidgets. For example, socialization widgets may include a Discussion Forum, a Chat, Polls, Surveys, Games (for e.g., Betting), Highlighting, and Screen Sharing. For example, a developer may design custom social widgets for apps.

For example, a social network may be based on an app context.

Figure 9:
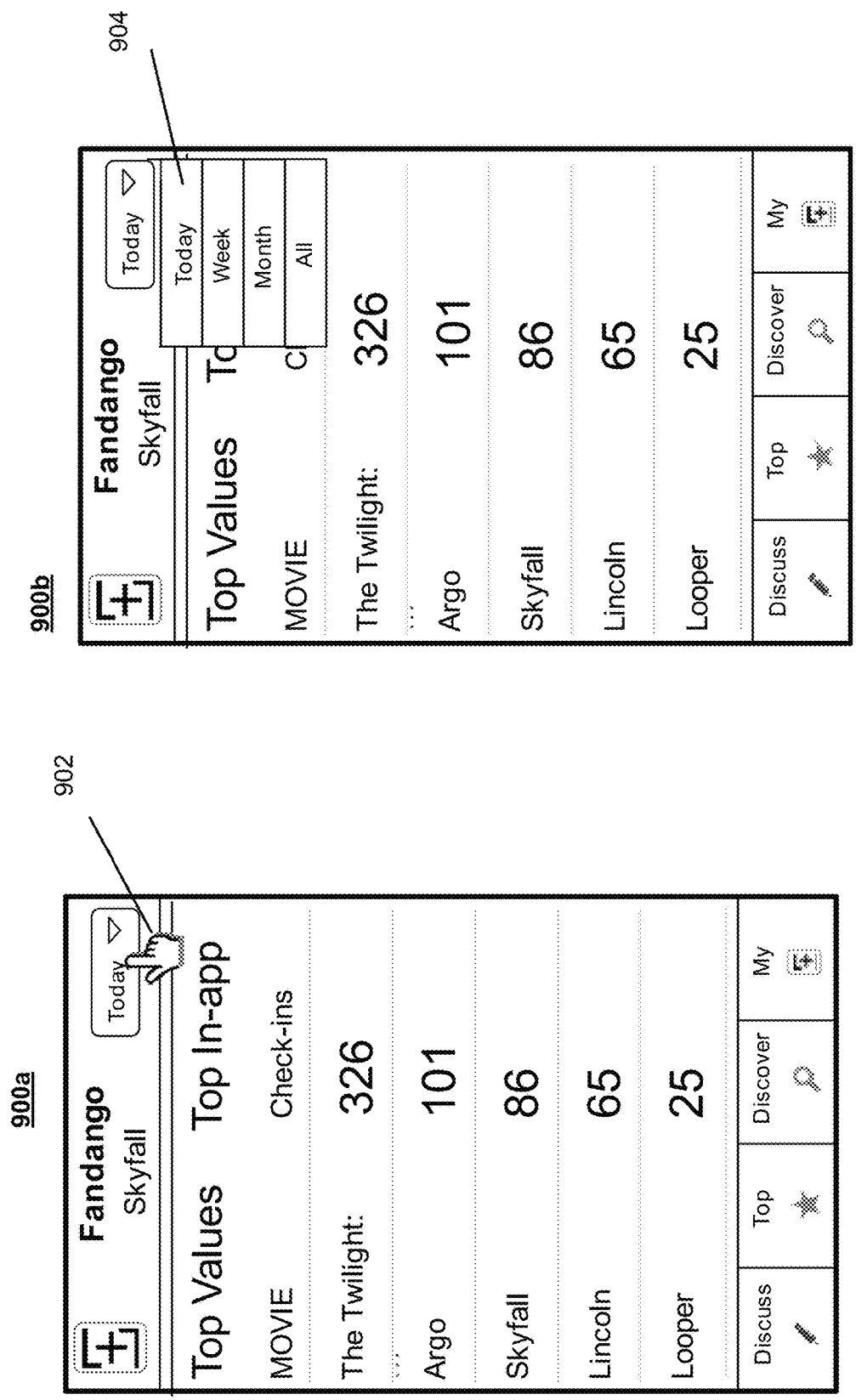
FIG. 9 illustrates an example query of top values in a time window.

FIG. 9 illustrates an example query 902 of "top values" in a time window 904 (e.g., day, week, month, etc.).

Figure 10:
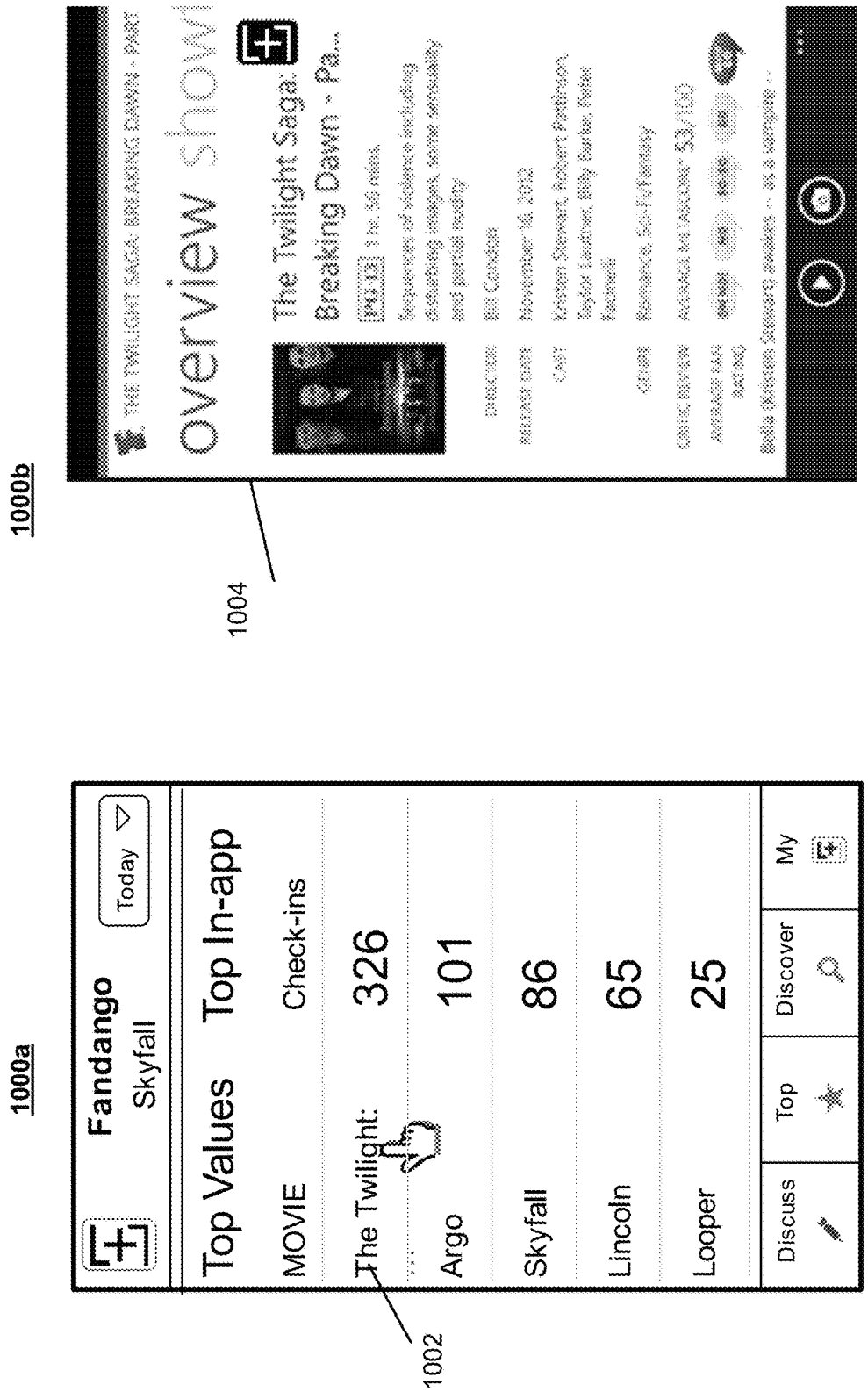
FIG. 10 illustrates an example intra-app link for users to navigate pages.

FIG. 10 illustrates an example intra-app link 1002 that enables the user to navigate to a page 1004 referenced by the intra-app link 1002.

FIG. 11 illustrates an example selection 1102 of "top in-app values" that enables the user to view top in-app values 1104.

FIG. 12 illustrates an example intra-app link 1202 that enables the user to navigate to a page 1204 referenced by the intra-app link 1202.

Figure 13:
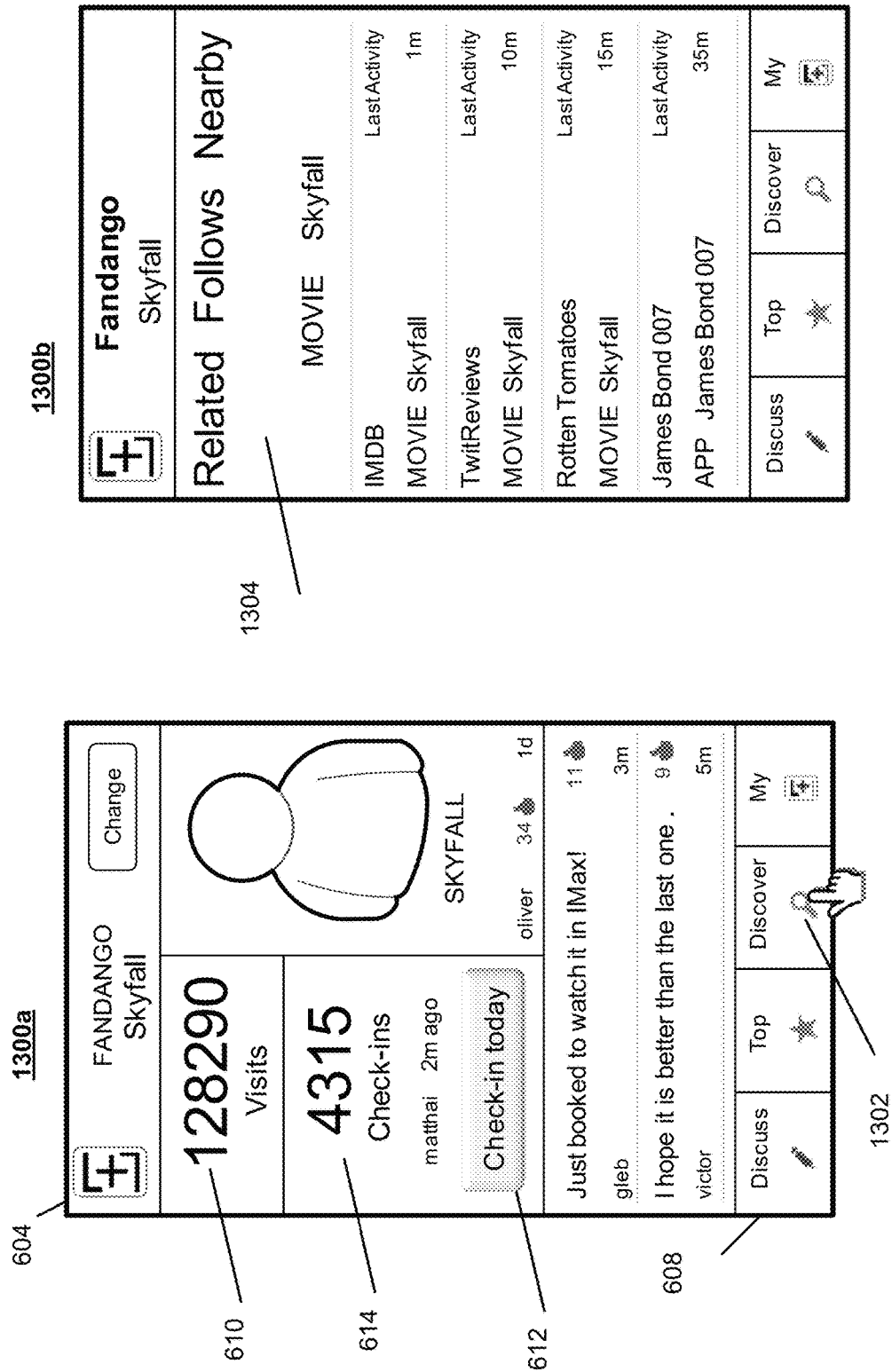
FIG. 13 illustrates an example discover selection for discovering apps that are related to a current application.

FIG. 13 illustrates an example "discover" selection 1302 that enables the user to discover one or more related apps 1304 that are related to the current application (before the selection 1302), based on the current application's context (e.g., Movie "SKYFALL" within application FANDANGO).

FIG. 14 illustrates an example "follows" selection 1402 that enables the user to discover app and app content 1404 that are used by other users that are followed by the current user.

FIG. 15 illustrates an example "nearby" selection 1502 that enables the user to discover app and app content 1504 that are being used by other users that are nearby the current user, based on location.

Figure 16:
FIG. 16 illustrates an example featured selection.

FIG. 16 illustrates an example "featured" selection 1602 that enables the user to receive featured offerings 1604 (e.g., coupons, items for sale, etc.) that may be monetized based on bidding for app context.

Figure 17:
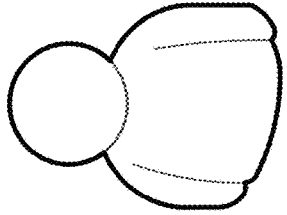
FIG. 17 illustrates an example Discuss selection.

FIG. 17 illustrates an example "Discuss" selection 1702 that enables the user to engage in discussions 1704 with other users regarding the current application and context.

FIG. 18 illustrates an example name selection 1802 that enables the user to view information 1804 related to the name selected (e.g., to "follow" the user associated with the selected name). Thus, the user may engage in social networking activity based on the current app context.

Figure 19:
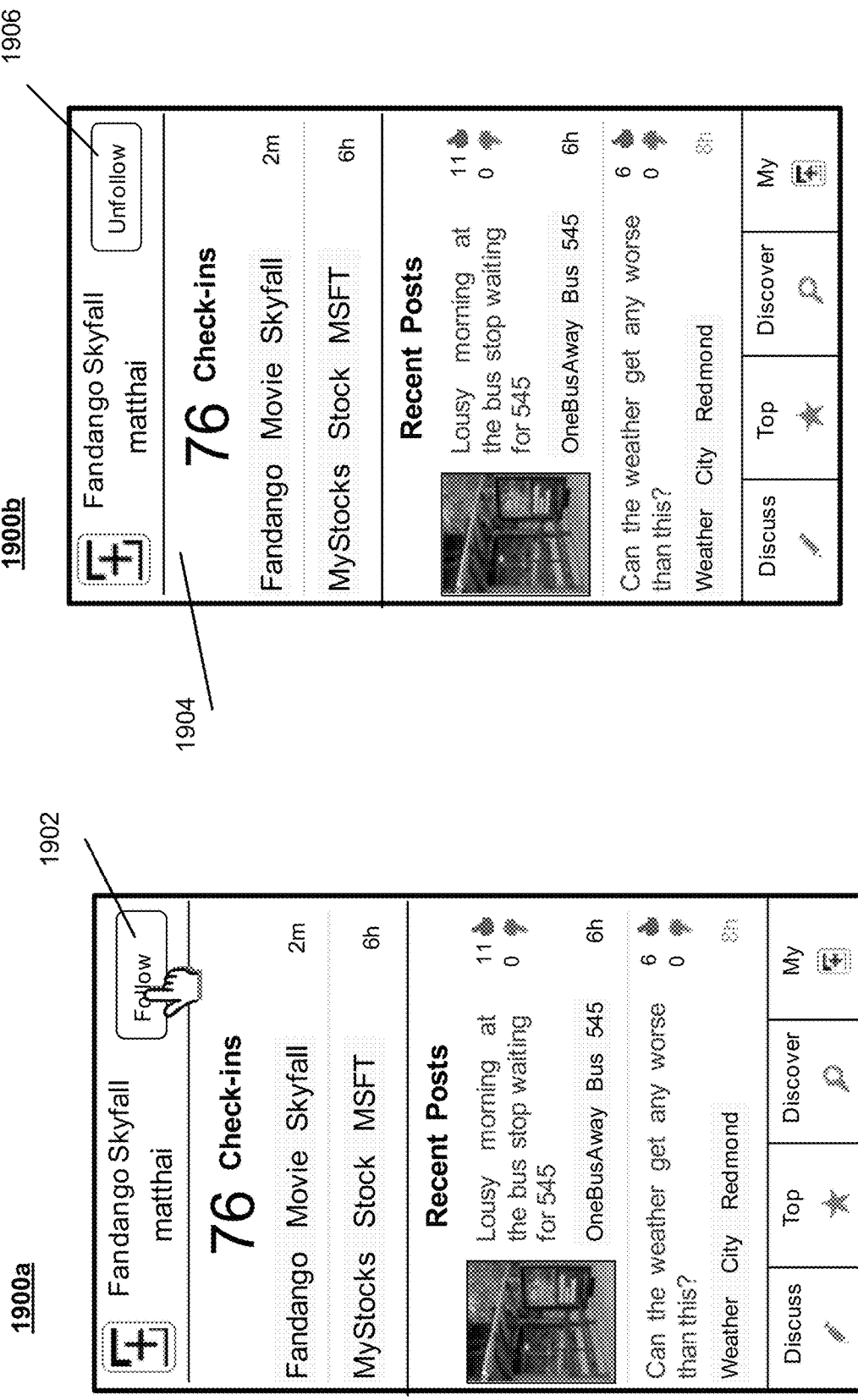
FIG. 19 illustrates an example follow selection.

FIG. 19 illustrates an example "follow" selection 1902 that enables the user to follow another user, and to view information 1904 related to the name selected. Thus, the user may engage in social networking activity based on the current app context. As shown in FIG. 19, the user may also select an "unfollow" option 1906 to undo a "follow" selection.

FIG. 20 illustrates an example technique for providing analytics information to a user. In the example of FIG. 20, a user may select a "map" option 2002, to obtain a heat map 2004 illustrating analytics related to user check-ins over the continental United States.

For example, the context determination component 138 may be configured to determine a current active user usage of an application.

For example, the socialization component 150 may be configured to determine a related context-based socialization activity for a user based on a current context 146 that is determined based on the determined current active user usage of the application.

For example, the context graph traversal component 154 may be configured to initiate traversal of a context graph 110 to determine one or more of a second context related to the current context 146, or a second application related to the application via the current context 146.

For example, an option display component 174 may initiate display of a user option 176 for context-based socialization from within the application.

For example, a user selection of the user option 176 may be received. For example, the user socialization may be initiated as a result of receiving the user selection of the user option 176.

A developer input component 180 may be configured to receive information for augmenting an application for application-centric socialization activities for a user of the application.

An app instrumentation component 182 may be configured to instrument the application for the application-centric socialization activities, based on the received information, the application-centric socialization activities launched from within the augmented application on a device, the application-centric socialization activities determined based on one or more contexts associated with the user that are determined during execution of the augmented application on the device.

One skilled in the art of data processing will understand that other algorithms may be used, without departing from the spirit of the discussion herein.

III. Flowchart Description

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

Figure 21A:
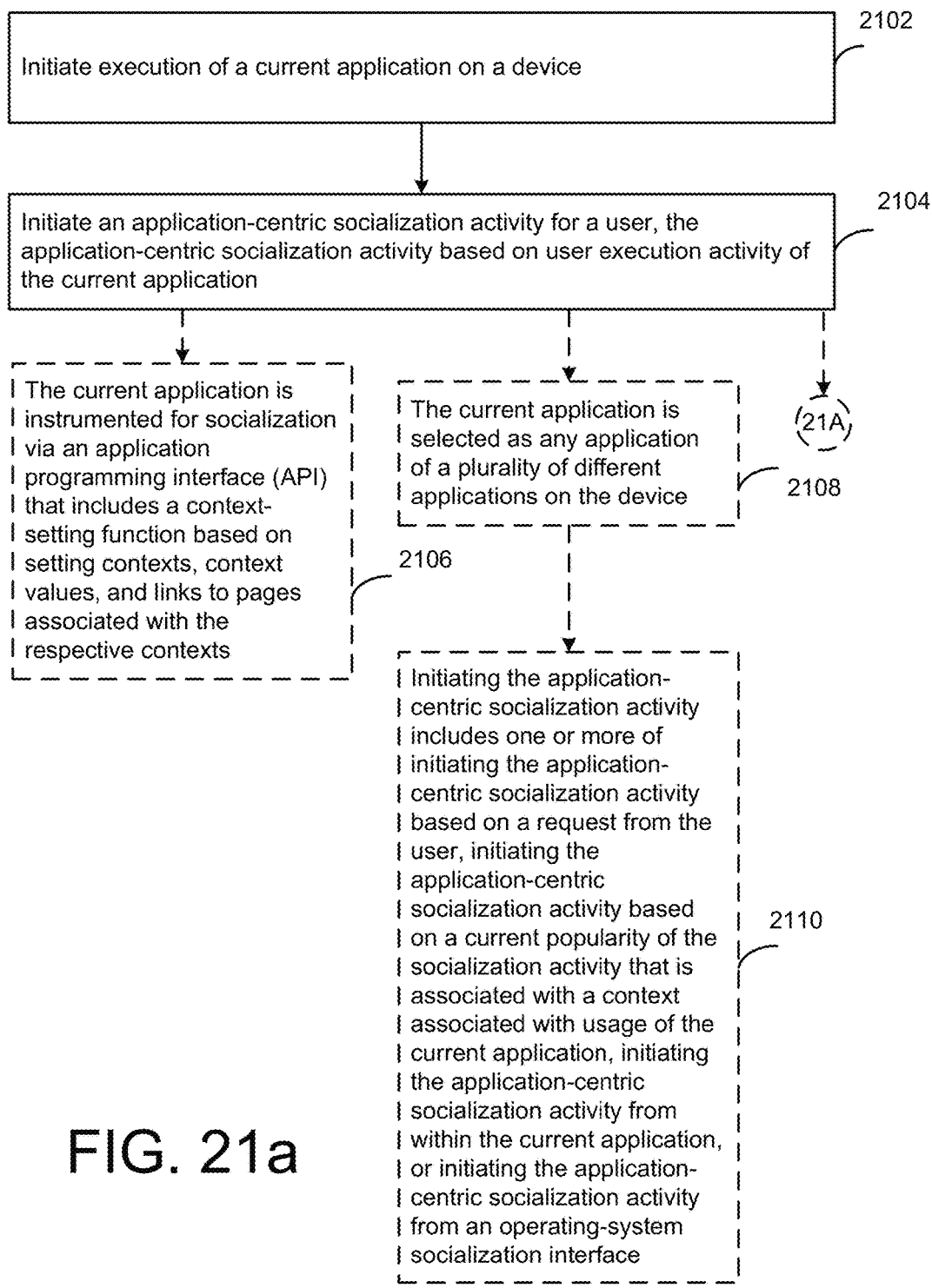

FIG. 21 is a flowchart illustrating example operations of the system of FIG. 1, according to example embodiments. In the example of FIG. 21a, execution of a current application may be initiated, on a device (2102). For example, the application manager 162 may initiate execution of the current application 148 on the device 102, as discussed above.

An application-centric socialization activity may be initiated for a user, the application-centric socialization activity based on user execution activity of the current application (2104). For example, the socialization component 150 may initiate an application-centric socialization activity for a user, the application-centric socialization activity based on user execution activity of the current application 148, as discussed above.

For example, the current application may be instrumented for socialization via an application programming interface (API) that includes a context-setting function based on setting contexts, context values, and links to pages associated with the respective contexts (2106).

For example, the current application may be selected as any application of a plurality of different applications on the device (2108). For example, the current application 148 may be selected as any application of a plurality of different applications on the device 102, as discussed above.

For example, initiating the application-centric socialization activity may include one or more of initiating the application-centric socialization activity based on a request from the user, initiating the application-centric socialization activity based on a current popularity of the socialization activity that is associated with a context associated with usage of the current application, initiating the application-centric socialization activity from within the current application, or initiating the application-centric socialization activity from an operating-system socialization interface (2110).

Figure 21B:
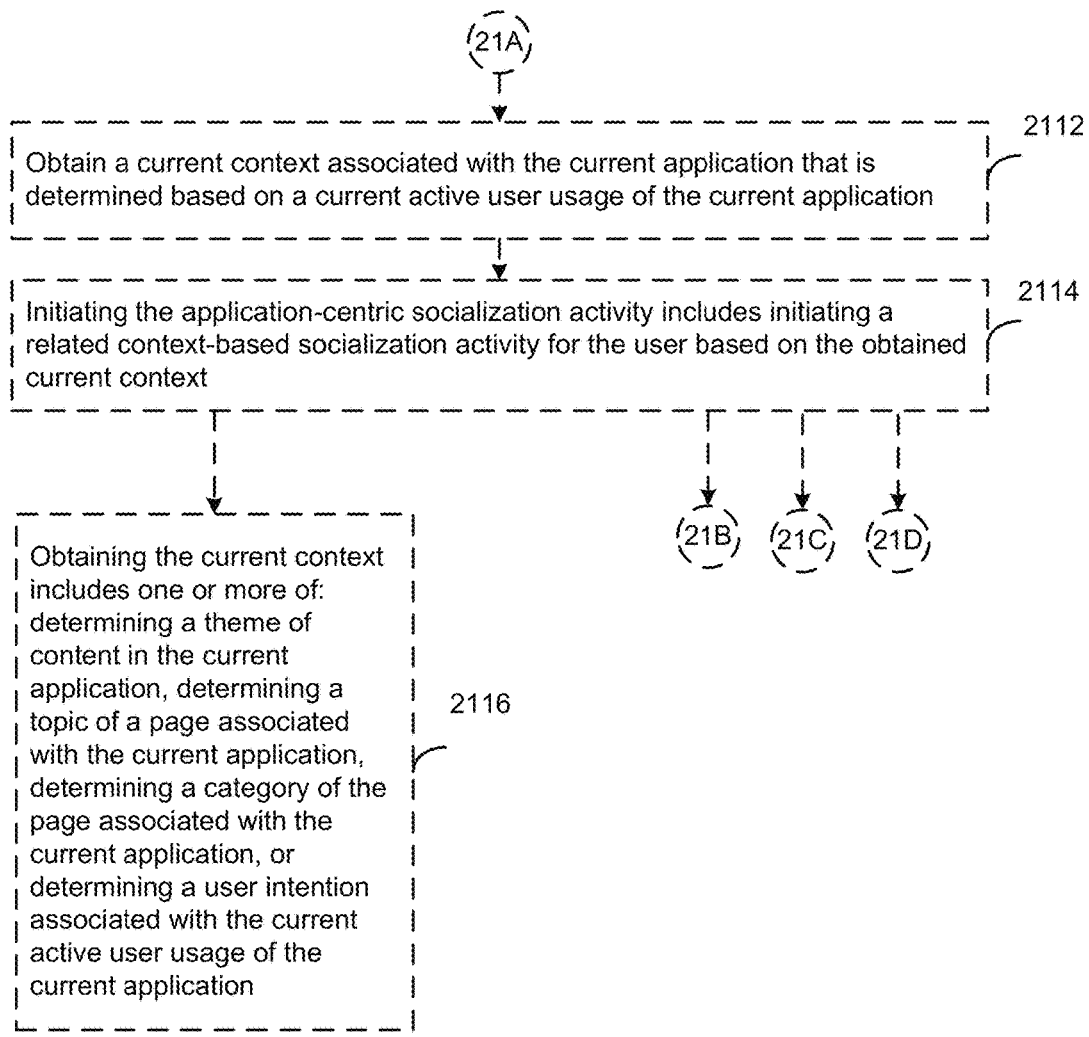

For example, a current context associated with the current application may be obtained (2112), in the example of FIG. 21*b*. The current context may be determined based on a current active user usage of the current application. For example, the context determination component 138 may obtain a current context 146 associated with the current application 148 that is determined based on a current active user usage of the current application 148, as discussed above.

For example, initiating the application-centric socialization activity may include initiating a related context-based socialization activity for the user based on the obtained current context (2114).

For example, obtaining the current context may include one or more of determining a theme of content in the current application, determining a topic of a page associated with the current application, determining a category of the page associated with the current application, or determining a user intention associated with the current active user usage of the current application (2116).

For example, one or more related applications may be determined based on the obtained current context (2118), in the example of FIG. 21*c*. For example, the related application determination component 164 may determine one or more related applications based on the obtained current context 146, as discussed above.

For example, initiating the application-centric socialization activity for the user may include one or more of initiating user activity in at least one of the related applications, or providing information associated with the one or more related applications to inform the user of related aspects of the one or more related applications (2120).

For example, determining the one or more related applications may include determining the one or more related applications based on a social network associated with the user (2122).

For example, at least one other application and content associated with the determined at least one other application, may be determined, based on one or more of a social network associated with the user, or a location (2124). For example, the related application determination component 164 may be configured to determine at least one other application and content associated with the determined at least one other application based on one or more of a social network associated with the user, or a location, as discussed above.

For example, if the at least one other application is not currently installed on the device, information may be provided for one or more of downloading or installing the at least one other application on the device (2126). For example, the download component 166 may provide information for one or more of downloading or installing the at least one other application on the device, if it is determined that the at least one other application is not currently installed on the device, as discussed above.

For example, the current context may be represented as a pair of nodes in a context graph, wherein the pair of nodes includes a key node and a value node connected via a corresponding edge representing a key-value relationship between the key node and the value node (2128).

For example, traversal of the context graph may be initiated to determine one or more of a second context related to the current context, or a second application related to the current application via the current context (2130). For example, the context graph traversal component 154 may initiate traversal of the context graph 110 to determine one or more of a second context related to the current context 146, or a second application related to the current application 148 via the current context 146, as discussed above.

Figure 22:
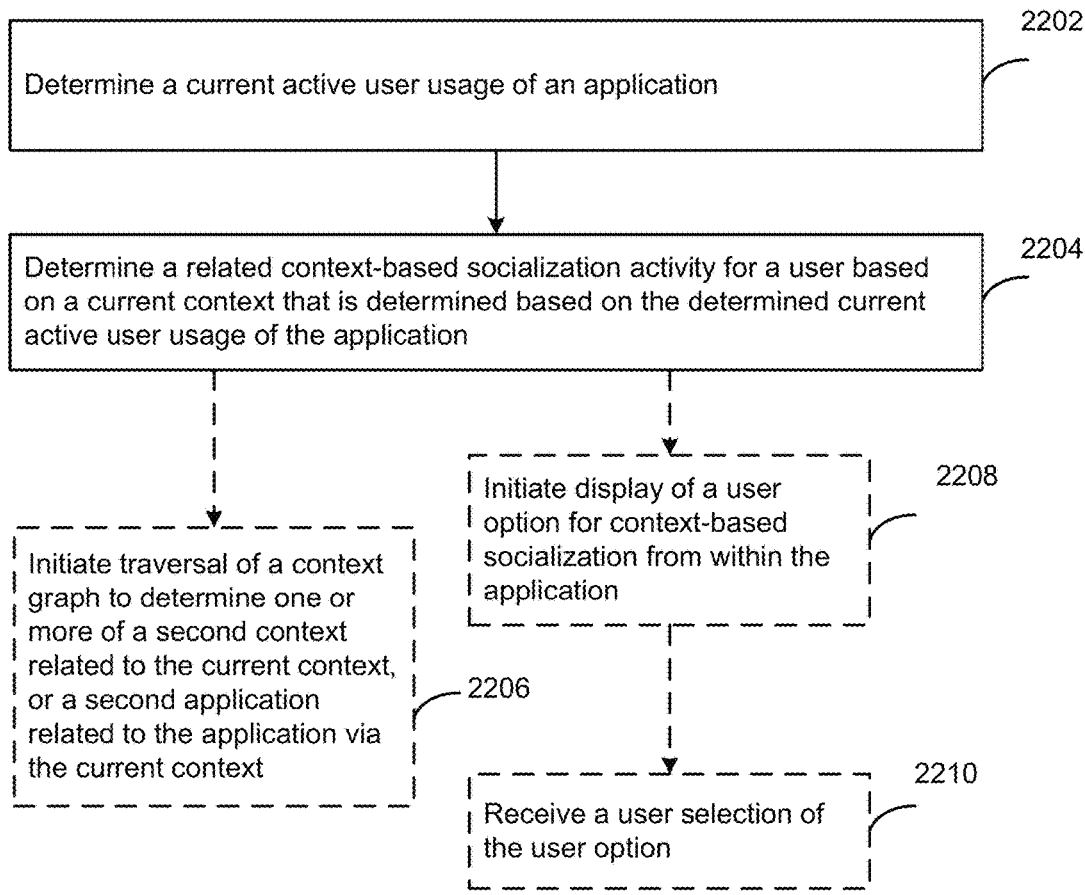
FIG. 22 is a flowchart illustrating example operations of the system of FIG. 1.

FIG. 22 is a flowchart illustrating example operations of the system of FIG. 1, according to example embodiments. In the example of FIG. 22*a*, a current active user usage of an application may be determined (2202). For example, the context determination component 138 may determine a current active user usage of an application, as discussed above.

A related context-based socialization activity may be determined for a user based on a current context that is determined based on the determined current active user usage of the application (2204). For example, the socialization component 150 may determine a related context-based socialization activity for a user based on a current context 146 that is determined based on the determined current active user usage of the application, as discussed above.

For example, traversal of a context graph may be initiated to determine one or more of a second context related to the current context, or a second application related to the application via the current context (2206). For example, the context graph traversal component 154 may initiate traversal of a context graph 110 to determine one or more of a second context related to the current context 146, or a second application related to the application via the current context 146, as discussed above.

For example, display of a user option for context-based socialization may be initiated from within the application (2208). For example, the option display component 174 may initiate display of a user option 176 for context-based socialization from within the application, as discussed above.

For example, a user selection of the user option may be received (2210).

Figure 23A:
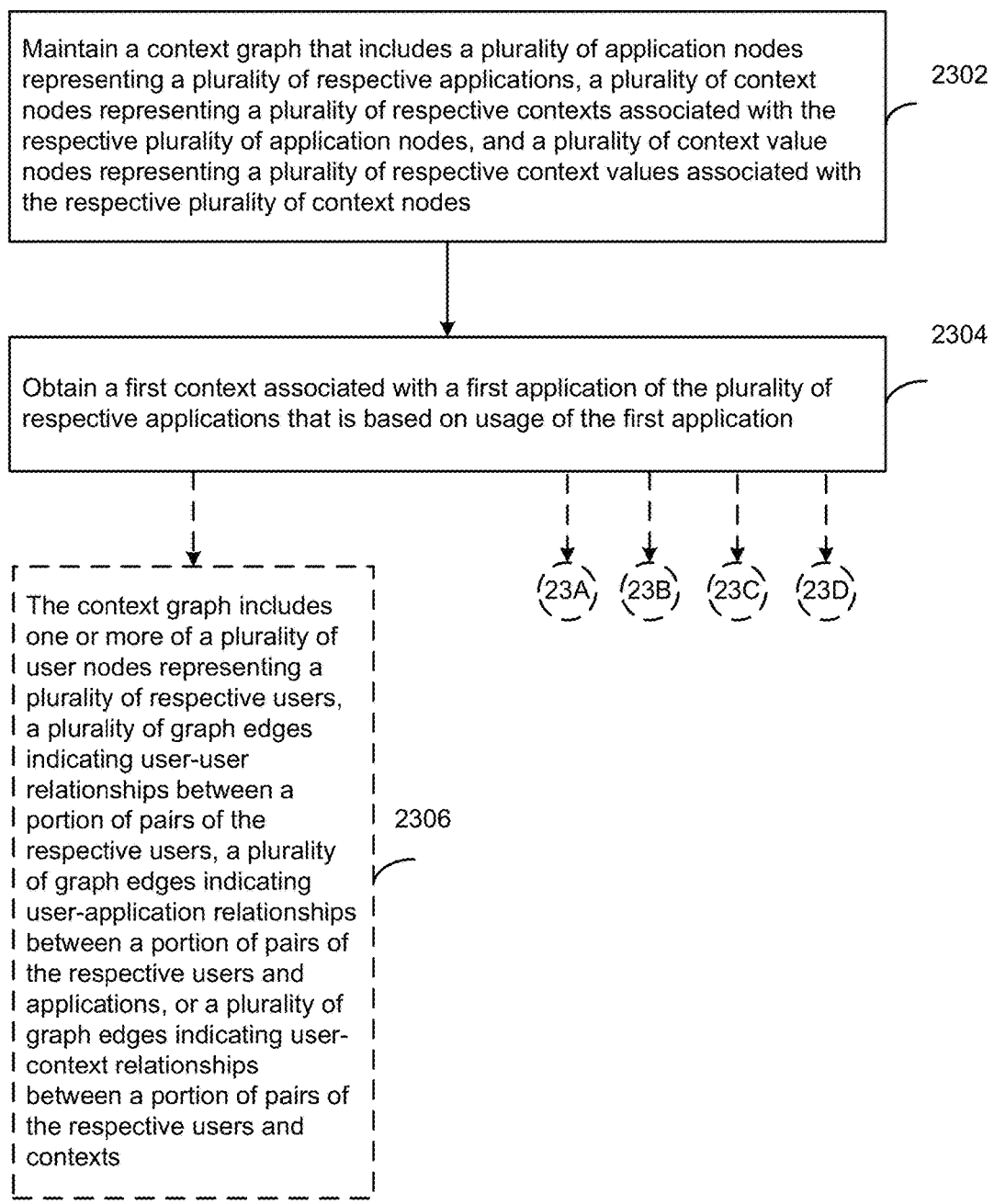

FIG. 23 is a flowchart illustrating example operations of the system of FIG. 1, according to example embodiments. In the example of FIG. 23*a*, a context graph may be maintained (2302). The context graph may include a plurality of application nodes representing a plurality of respective applications, a plurality of context nodes representing a plurality of respective contexts associated with the respective plurality of application nodes, and a plurality of context value nodes representing a plurality of respective context values associated with the respective plurality of context nodes. For example, the context graph determination component 108 may maintain a context graph 110 that includes a plurality of application nodes 112 representing a plurality of respective applications, a plurality of context nodes 114 representing a plurality of respective contexts associated with the respective plurality of application nodes 112, and a plurality of context value nodes 116 representing a plurality of respective context values associated with the respective plurality of context nodes 112, as discussed above.

A first context associated with a first application of the plurality of respective applications may be obtained (2304). The first context may be based on usage of the first application. For example, the context determination component 138 may obtain a first context 142 associated with a first application 144 of the plurality of respective applications that is based on usage of the first application 144, as discussed above.

For example, the context graph may include one or more of a plurality of user nodes representing a plurality of respective users, a plurality of graph edges indicating user-user relationships between a portion of pairs of the respective users, a plurality of graph edges indicating user-application relationships between a portion of pairs of the respective users and applications, or a plurality of graph edges indicating user-context relationships between a portion of pairs of the respective users and contexts (2306).

Figure 23B:
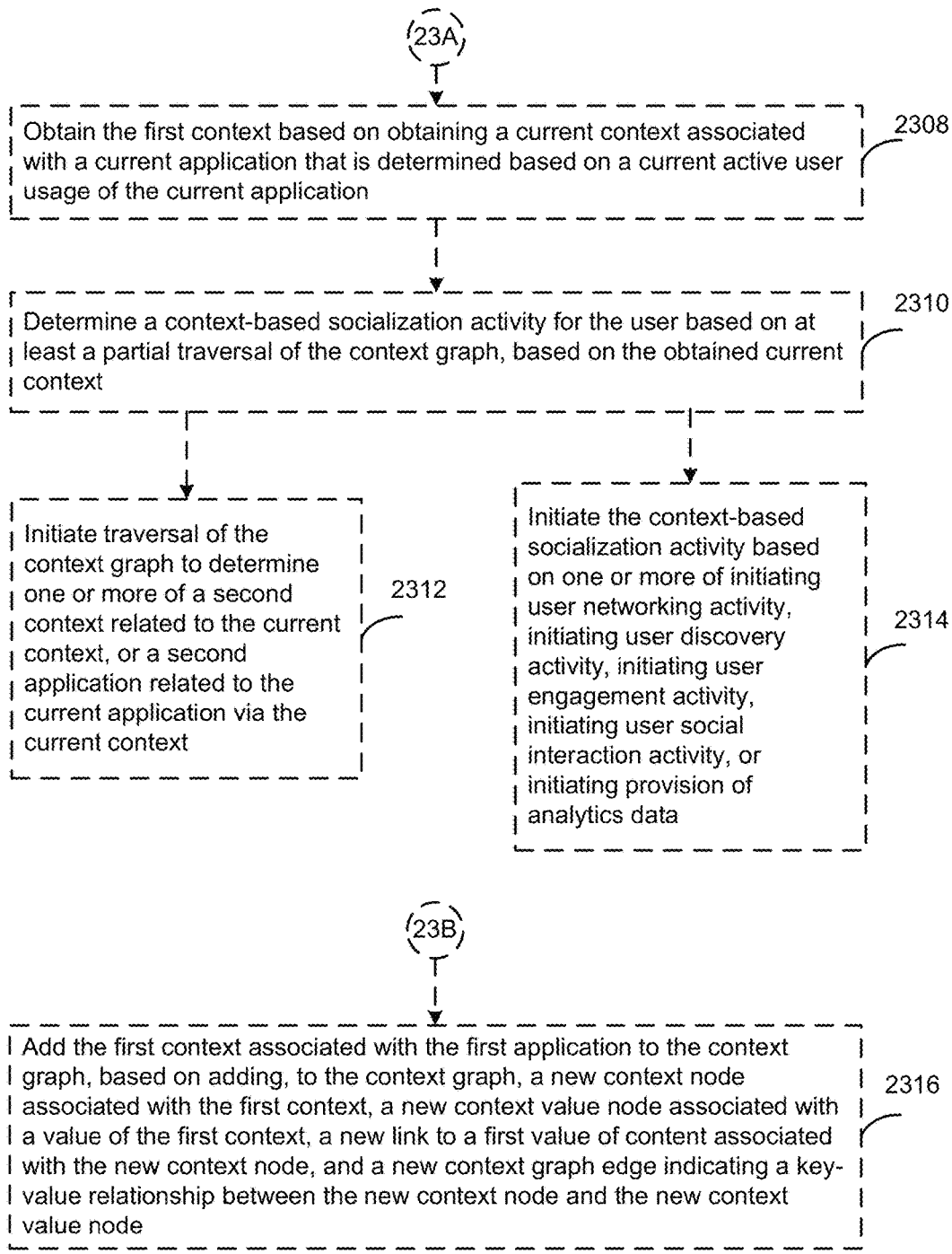

For example, the first context may be obtained based on obtaining a current context associated with a current application that is determined based on a current active user usage of the current application (2308), in the example of FIG. 23b. For example, the context determination component 138 may obtain the first context 142 based on obtaining a current context 146 associated with a current application 148 that is determined based on a current active user usage of the current application 148, as discussed above.

For example, a context-based socialization activity may be determined for the user based on at least a partial traversal of the context graph, based on the obtained current context (2310). For example, the socialization component 150 may determine a context-based socialization activity 152 for the user based on at least a partial traversal of the context graph 110, based on the obtained current context 146, as discussed above.

For example, traversal of the context graph may be initiated to determine one or more of a second context related to the current context, or a second application related to the current application via the current context (2312). For example, the context graph traversal component 154 may initiate traversal of the context graph 110 to determine one or more of a second context related to the current context 146, or a second application related to the current application 148 via the current context 146, as discussed above.

For example, the context-based socialization activity may be initiated based on one or more of initiating user networking activity, initiating user discovery activity, initiating user engagement activity, initiating user social interaction activity, or initiating provision of analytics data (2314). For example, the socialization component 150 may initiate the context-based socialization activity based on one or more of initiating user networking activity, initiating user discovery activity, initiating user engagement activity, initiating user social interaction activity, or initiating provision of analytics data, as discussed above.

For example, the first context associated with the first application may be added to the context graph, based on adding, to the context graph, a new context node associated with the first context, a new context value node associated with a value of the first context, a new link to a first value of content associated with the new context node, and a new context graph edge indicating a key-value relationship between the new context node and the new context value node (2316). For example, the context graph determination component 108 may add the first context 142 associated with the first application 144 to the context graph 110, based on adding, to the context graph 110, a new context node 114 associated with the first context 142, a new context value node 116 associated with a value of the first context 142, a new link to a first value of content associated with the new context node 114, and a new context graph edge indicating a key-value relationship between the new context node 114 and the new context value node 116, as discussed above.

For example, the first context may be obtained based on one or more of at least a partial traversal of a social network that is external to the context graph, at least a partial traversal of the context graph, or a location (2318), in the example of FIG. 23c. For example, the context determination component 138 may obtain the first context 142 based on one or more of at least a partial traversal of a social network 156 that is external to the context graph 110, at least a partial traversal of the context graph 110, or a location 158, as discussed above.

For example, information may be maintained that is associated with user check-in activity associated with respective context nodes (2320). For example, the context graph determination component 108 may maintain information associated with user check-in activity associated with respective context nodes 114, as discussed above.

Figure 24A:
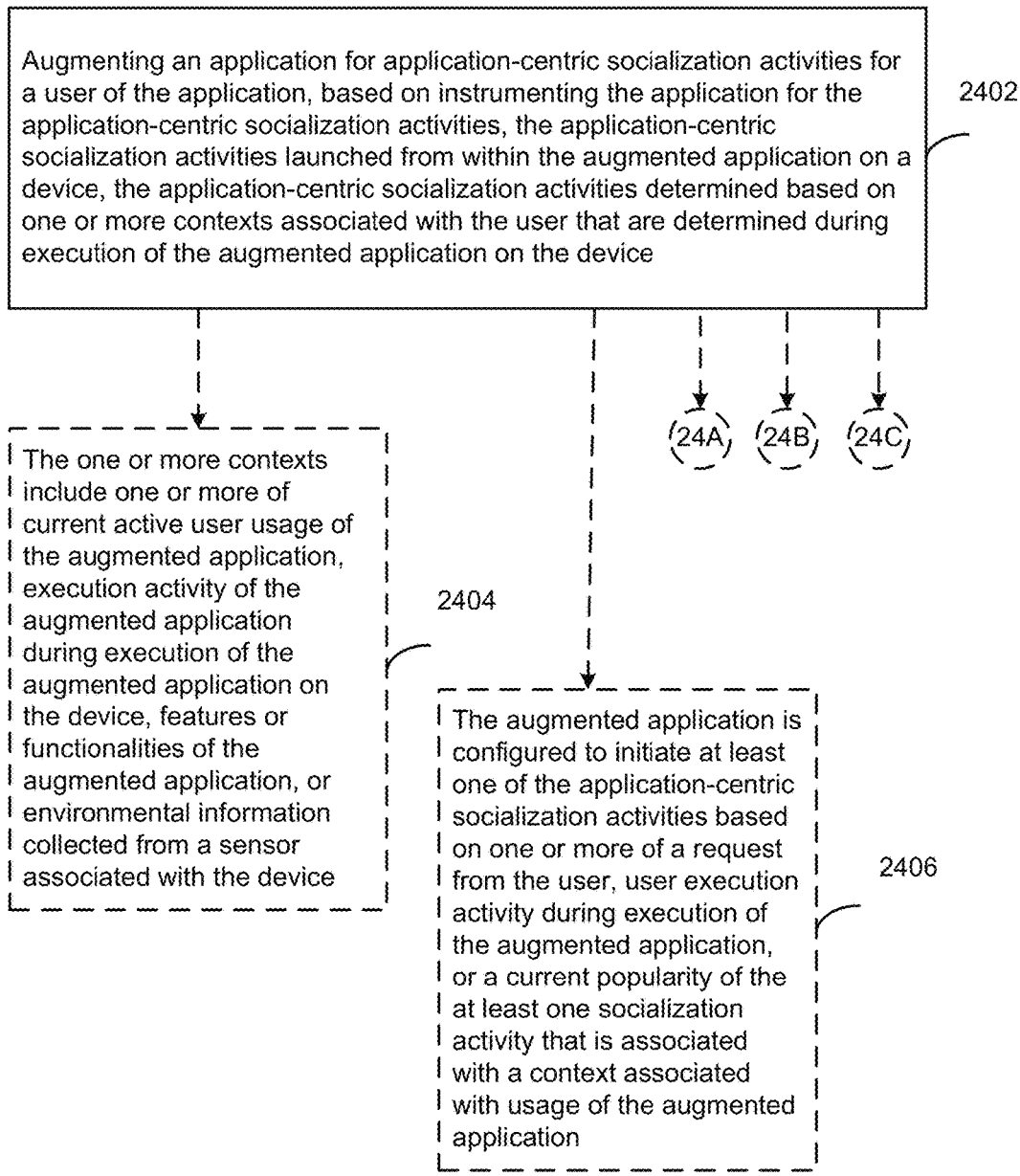

FIG. 24 is a flowchart illustrating example operations of the system of FIG. 1, according to example embodiments. In the example of FIG. 24a, an application may be augmented for application-centric socialization activities for a user of the application, based on instrumenting the application for the application-centric socialization activities, the application-centric socialization activities launched from within the augmented application on a device (2402). The application-centric socialization activities may be determined based on one or more contexts associated with the user that are determined during execution of the augmented application on the device.

For example, the one or more contexts may include one or more of current active user usage of the augmented application, execution activity of the augmented application during execution of the augmented application on the device, features or functionalities of the augmented application, or environmental information collected from a sensor associated with the device (2404).

For example, the augmented application may be configured to initiate at least one of the application-centric socialization activities based on one or more of a request from the user, user execution activity during execution of the augmented application, or a current popularity of the at least one socialization activity that is associated with a context associated with usage of the augmented application (2406).

Figure 24B:
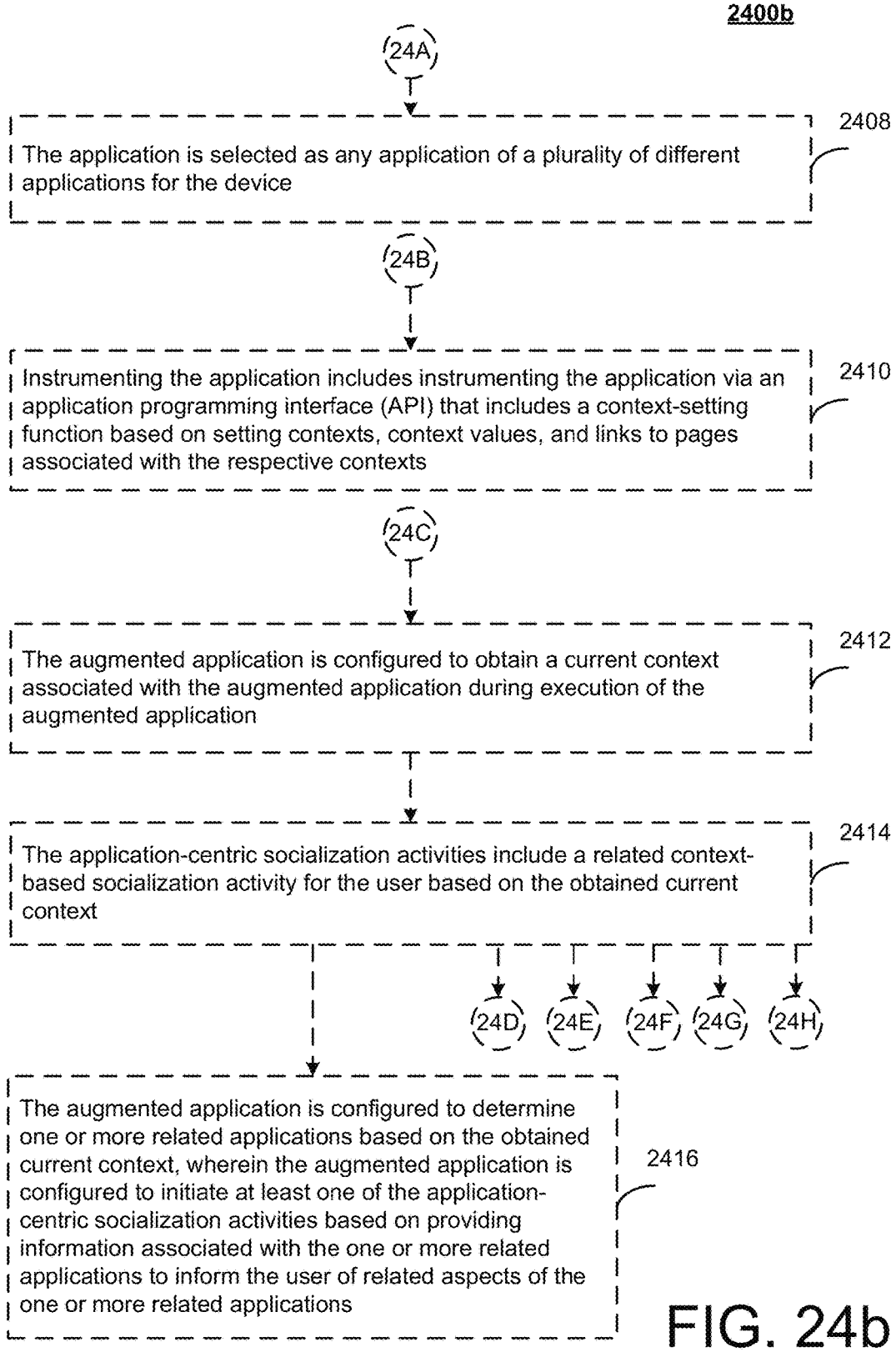

For example, the application may be selected as any application of a plurality of different applications for the device (2408), in the example of FIG. 24b.

For example, instrumenting the application may include instrumenting the application via an application programming interface (API) that includes a context-setting function based on setting contexts, context values, and links to pages associated with the respective contexts (2410).

For example, the augmented application may be configured to obtain a current context associated with the augmented application during execution of the augmented application (2412).

For example, the application-centric socialization activities may include a related context-based socialization activity for the user based on the obtained current context (2414).

For example, the augmented application may be configured to determine one or more related applications based on the obtained current context, wherein the augmented application is configured to initiate at least one of the application-centric socialization activities based on providing information associated with the one or more related applications to inform the user of related aspects of the one or more related applications (2416).

For example, the augmented application may be configured to determine one or more related applications based on the obtained current context, wherein the augmented application is configured to initiate at least one of the application-centric socialization activities based on initiating user activity in at least one of the related applications (2418), in the example of FIG. 24c.

For example, the augmented application may be configured to determine at least one other application and content associated with the determined at least one other application based on the obtained current context, determine whether the at least one other application is installed on the device, provide information for installing the at least one other application on the device, if the at least one other application is not currently installed on the device, and initiate execution of the at least one other application on the device, if the at least one other application is installed on the device (2420).

For example, the obtained current context may be represented as a pair of nodes in a context graph, wherein the pair of nodes includes a key node and a value node connected via a corresponding edge representing a key-value relationship between the key node and the value node, wherein the augmented application is configured to initiate traversal of the context graph to determine a second context related to the obtained current context (2422).

For example, the obtained current context may be represented as a pair of nodes in a context graph, wherein the pair of nodes includes a key node and a value node connected via a corresponding edge representing a key-value relationship between the key node and the value node, wherein the augmented application may be configured to initiate traversal of the context graph to determine a second application related to the augmented application via the obtained current context (2424), in the example of FIG. 24d.

For example, obtaining the current context may include determining a user intention associated with the current active user usage of the augmented application during execution of the augmented application (2426).

One skilled in the art of data processing will understand that there are many ways of providing application-centric socialization, without departing from the spirit of the discussion herein.

Customer privacy and confidentiality have been ongoing considerations in data processing environments for many years. Thus, example techniques discussed herein may use user input and/or data provided by users who have provided permission via one or more subscription agreements (e.g., "Terms of Service" (TOS) agreements) with associated applications or services associated with socialization activities. For example, users may provide consent to have their input/data transmitted and stored on devices, though it may be explicitly indicated (e.g., via a user accepted text agreement) that each party may control how transmission and/or storage occurs, and what level or duration of storage may be maintained, if any.

Implementations of the various techniques described herein may be implemented in digital electronic circuitry, or in computer hardware, firmware, software, or in combinations of them (e.g., an apparatus configured to execute instructions to perform various functionality).

Implementations may be implemented as a computer program embodied in a pure signal such as a pure propagated signal. Such implementations may be referred to herein as implemented via a "computer-readable transmission medium."

Alternatively, implementations may be implemented as a computer program embodied in a machine usable or machine readable storage device (e.g., a magnetic or digital medium such as a Universal Serial Bus (USB) storage device, a tape, hard disk drive, compact disk, digital video disk (DVD), etc.), for execution by, or to control the operation of, data processing apparatus, e.g., a programmable processor, a computer, or multiple computers. Such implementations may be referred to herein as implemented via a "computer-readable storage medium" or a "computer-readable storage device" and are thus different from implementations that are purely signals such as pure propagated signals.

A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable storage medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method comprising:
providing a common set of keys for use by a plurality of applications to expose application contexts;
providing an application programming interface (API) for the plurality of applications to call at runtime to set values for individual keys;
augmenting a first application by instrumenting the first application to identify a particular user interest expressed by a first user during execution of the first application on a first mobile device of the first user and call the API to set a particular key to a particular value representing the particular user interest; and
responsive to the first application setting the particular key to the particular value:
identifying a second application, other than the first application, that has also set the particular key to the same particular value as the first application by calling the API in response to a second user also expressing the particular user interest during execution of the second application on a second mobile device of the second user; and
initiating execution of the second application on the first mobile device of the first user,
wherein at least the identifying the second application is performed by a server that communicates with the first mobile device and the second mobile device over a network.

2. The method of claim 1, further comprising:
identifying a particular location in which the first user has expressed interest via the first application; and
providing the particular location to the second application, wherein the second application, when executed on the first mobile device, outputs information associated with the particular location.

3. The method of claim 1, further comprising:
configuring the first application to initiate an application-centric socialization activity based at least on the particular user interest.

4. The method of claim 3, the application-centric socialization activity comprising a discussion with other users.

5. The method of claim 4, further comprising identifying the discussion based at least on the particular user interest.

6. The method of claim 4, further comprising configuring the first application to employ a first widget to perform the discussion.

7. The method of claim 6, further comprising:
configuring the first widget to obtain messages relating to the particular value set by the first application using the API; and
configuring the first widget to display the messages with the first application.

8. The method of claim 1, further comprising:
representing the first application, the second application, and the particular value of the particular key as nodes in a context graph; and
identifying the second application by traversing the context graph.

9. The method of claim 8, the context graph having further nodes representing the individual keys.

10. The method of claim 9, the context graph having edges connecting different application nodes representing different applications to different key nodes representing different keys used by the different applications.

11. The method of claim 10, the context graph having further edges connecting the different key nodes to different value nodes representing different values set by the different applications for the different keys.

12. A system comprising:
at least one hardware processor; and
at least one memory storing computer-executable instructions which, when executed by the at least one hardware processor, cause the at least one hardware processor to:
provide a common set of keys for use by a plurality of applications to expose application contexts;

provide an application programming interface (API) for the plurality of applications to call at runtime to set values for individual keys;

identify a particular topic of interest expressed by a first user during execution of a first application on a first computing device, the first application being instrumented to call the API to set a particular key from the common set of keys to a particular value identifying the particular topic of interest;

responsive to the first application setting the particular key to the particular value:

identify a second application, other than the first application, that has also set the particular key to the same particular value as the first application by calling the API in response to a second user also expressing the particular topic of interest during execution of the second application on a second computing device of the second user; and send installation information for the second application over a network from the system to the first computing device.

13. The system of claim 12, wherein the computer-executable instructions, when executed by the at least one hardware processor, cause the at least one hardware processor to:

identify the second user to the first user responsive to detecting that the second user has expressed interest in the particular topic of interest during execution of the second application on the second computing device.

14. The system of claim 12, the API specifying a first parameter identifying the particular key and a second parameter identifying the particular value.

15. The system of claim 12, wherein the computer-executable instructions, when executed by the at least one hardware processor, cause the at least one hardware processor to:

configure a widget to tag particular content with the particular value for the particular key;

configure the first application to incorporate the widget; and responsive to the first application setting the particular value for the particular key, cause the widget to provide the particular content to the first user on the first computing device.

16. The system of claim 15, the particular content comprising messages tagged with the particular value.

17. The system of claim 15, the particular content comprising images tagged with the particular value.

18. A hardware computer-readable storage medium storing executable code that, when executed, causes one or more processors to perform acts comprising:

providing a common set of keys for use by a plurality of applications to expose application contexts;

providing an application programming interface (API) for the plurality of applications to call at runtime to set values for individual keys;

augmenting a first application by instrumenting the first application to identify a particular category of interest expressed by a first user during execution of the first application on a first computing device by calling the API to set a particular key from the common set of keys to a particular value identifying the particular category of interest;

identifying a second application, other than the first application, that has also set the particular key to the same particular value as the first application by calling the API in response to a second user expressing interest in the particular category of interest during execution of the second application on a second computing device of the second user; and responsive to identifying that the second application has also set the particular key to the particular value, initiating execution of the second application on the first computing device by communicating with the second computing device over a network.

19. The hardware computer-readable storage medium of claim 18, the acts further comprising:

causing the first computing device to display an option to identify related applications to the first application;

receiving another first user input selecting the option to identify the related applications; and identifying the second application to the first user responsive to the another first user input.

20. The hardware computer-readable storage medium of claim 18, the first computing device and the second computing device being mobile computing devices.

* * * * *